(12) United States Patent
Shimooka et al.

(10) Patent No.: US 9,065,116 B2
(45) Date of Patent: Jun. 23, 2015

(54) LITHIUM SECONDARY BATTERY POSITIVE ELECTRODE AND LITHIUM SECONDARY BATTERY

(75) Inventors: Toshiharu Shimooka, Osaka (JP); Itaru Gosho, Osaka (JP); Akira Inaba, Osaka (JP); Masayuki Yamada, Osaka (JP); Kazutaka Matsuo, Osaka (JP); Satoshi Kono, Osaka (JP)

(73) Assignee: HITACHI MAXELL, LTD., Ibaraki-shi, Osaka (JP)

( * ) Notice: Subject to any disclaimer, the term of this patent is extended or adjusted under 35 U.S.C. 154(b) by 801 days.

(21) Appl. No.: 13/043,569

(22) Filed: Mar. 9, 2011

(65) Prior Publication Data

US 2011/0262796 A1  Oct. 27, 2011

(30) Foreign Application Priority Data

Apr. 22, 2010 (JP) ................................. 2010-098402
Jan. 6, 2011 (JP) ................................. 2011-000893

(51) Int. Cl.
| | |
|---|---|
| *H01M 4/13* | (2010.01) |
| *H01M 4/60* | (2006.01) |
| *H01M 2/16* | (2006.01) |
| *H01M 4/00* | (2006.01) |
| *H01M 4/50* | (2010.01) |

(Continued)

(52) U.S. Cl.
CPC .............. *H01M 4/131* (2013.01); *H01M 4/133* (2013.01); *H01M 2/16* (2013.01); *H01M 2/1653* (2013.01); *H01M 2/1686* (2013.01); *H01M 2/34* (2013.01); *H01M 4/134* (2013.01); *H01M 4/483* (2013.01); *H01M 4/505* (2013.01); *H01M 4/525* (2013.01); *H01M 4/587* (2013.01); *H01M 4/625* (2013.01); *H01M 6/164* (2013.01); *H01M 10/0525* (2013.01); *H01M 10/0569* (2013.01); *H01M 2010/4292* (2013.01); *H01M 2300/0034* (2013.01); *Y02E 60/122* (2013.01)

(58) Field of Classification Search
USPC ........................................ 429/212, 213, 247
IPC ............. H01M 4/625,4/133, 4/505, 2/16, 4/131
See application file for complete search history.

(56) References Cited

U.S. PATENT DOCUMENTS

| 4,731,304 A | * | 3/1988 | Lundquist et al. ............... 429/62 |
| 7,358,011 B2 | * | 4/2008 | Fukuoka et al. ............... 429/232 |

(Continued)

FOREIGN PATENT DOCUMENTS

| CN | 11212035 A | 7/2008 |
| CN | 101425575 A | 5/2009 |

(Continued)

*Primary Examiner* — Patrick Ryan
*Assistant Examiner* — Julian Anthony
(74) *Attorney, Agent, or Firm* — Birch, Stewart, Kolasch & Birch, LLP

(57) ABSTRACT

A lithium secondary battery positive electrode according to the present invention is a lithium secondary battery positive electrode including a positive electrode material mixture layer containing a positive electrode active material and a conductivity enhancing agent on one or both sides of a current collector, wherein the positive electrode active material contains a lithium-containing composite oxide, the conductivity enhancing agent contains carbon fibers having an average fiber length of 10 nm or more and less than 1000 nm and an average fiber diameter of 1 nm or more and 100 nm or less, and the content of the carbon fibers in the positive electrode material mixture layer is 0.25 mass % or more and 1.5 mass % or less.

14 Claims, 2 Drawing Sheets

(51) Int. Cl.
*H01M 4/58* (2010.01)
*H01M 6/16* (2006.01)
*H01M 4/131* (2010.01)
*H01M 4/48* (2010.01)
*H01M 4/525* (2010.01)
*H01M 4/62* (2006.01)
*H01M 10/0525* (2010.01)
*H01M 10/0569* (2010.01)
*H01M 4/133* (2010.01)
*H01M 2/34* (2006.01)
*H01M 4/134* (2010.01)
*H01M 4/505* (2010.01)
*H01M 4/587* (2010.01)
*H01M 10/42* (2006.01)

(56) References Cited

U.S. PATENT DOCUMENTS

| | | | |
|---|---|---|---|
| 8,323,831 B2 * | 12/2012 | Wilkins et al. | 429/217 |
| 8,426,064 B2 * | 4/2013 | Oki et al. | 429/212 |
| 8,507,132 B2 * | 8/2013 | Wakita et al. | 429/212 |
| 8,563,157 B2 * | 10/2013 | Hasegawa et al. | 429/129 |
| 2009/0111019 A1 | 4/2009 | Hirose et al. | |
| 2010/0119949 A1 | 5/2010 | Yano et al. | |

FOREIGN PATENT DOCUMENTS

| | | |
|---|---|---|
| CN | 101476044 A | 7/2009 |
| CN | 101669236 A | 3/2010 |
| JP | 2009-16265 A | 1/2009 |

* cited by examiner

LITHIUM SECONDARY BATTERY POSITIVE ELECTRODE AND LITHIUM SECONDARY BATTERY

BACKGROUND OF THE INVENTION

1. Field of the Invention

The present invention relates to a lithium secondary battery having a high capacity and good load characteristics and charge/discharge cycle characteristics, and a lithium secondary battery positive electrode for forming such a lithium secondary battery.

2. Description of the Related Art

Non-aqueous electrolyte lithium secondary batteries including lithium ion secondary batteries provide high voltage and high capacity, and therefore are widely used as power sources for various portable devices. In recent years, their applications are expanding to include medium and large size applications such as power tools including electric tools, electric vehicles and electric bicycles.

Currently, various improvements are still being made to lithium secondary batteries for the purpose of improving battery characteristics and the like. For example, JP 2009-16265 A proposes a lithium-based battery (lithium secondary battery) in which high current load characteristics in particular are improved by specifying the electrode active material size, the shape of carbon fibers used as a carbonaceous conductivity enhancing agent, as well as the aggregated state of the carbon fibers.

Further improvements in characteristics are therefore expected to be required for lithium secondary batteries along with the enhanced functionality of devices used and the like.

SUMMARY OF THE INVENTION

The present invention has been conceived under the circumstances described above, and it is an object of the present invention to provide a lithium secondary battery having a high capacity and good load characteristics and charge/discharge cycle characteristics and a lithium secondary battery positive electrode for forming such a lithium secondary battery.

A lithium secondary battery positive electrode according to the present invention is a lithium secondary battery positive electrode including a positive electrode material mixture layer containing a positive electrode active material and a conductivity enhancing agent on one or both sides of a current collector, wherein the positive electrode active material contains a lithium-containing composite oxide, the conductivity enhancing agent contains carbon fibers having an average fiber length of 10 nm or more and less than 1000 nm and an average fiber diameter of 1 nm or more and 100 nm or less, and the content of the carbon fibers in the positive electrode material mixture layer is 0.25 mass % or more and 1.5 mass % or less.

A lithium secondary battery according to the present invention is a lithium secondary battery including a positive electrode, a negative electrode, a non-aqueous electrolyte and a separator, wherein the lithium secondary battery positive electrode of the present invention is used as the positive electrode.

DESCRIPTION OF THE PREFERRED EMBODIMENTS

Figure 1A:
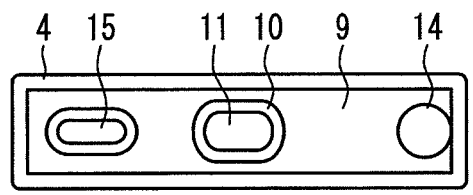
FIG. 1A is a plan view showing an example of a lithium secondary battery according to the present invention.

Lithium Secondary Battery Positive Electrode of the Present Invention

A lithium secondary battery positive electrode of the present invention will be described first.

The lithium secondary battery positive electrode of the present invention includes a positive electrode material mixture layer containing a positive electrode active material and a conductivity enhancing agent on one or both sides of a current collector.

The conductivity enhancing agent used in the lithium secondary battery positive electrode of the present invention contains carbon fibers having an average fiber length of 10 nm or more and less than 1000 nm and an average fiber diameter of 1 nm or more and 100 nm or less, and the carbon fiber content in the positive electrode material mixture layer is 0.25 mass % or more and 1.5 mass % or less.

The carbon fibers used in the conductivity enhancing agent can be, for example, vapor-phase grown carbon fibers. Such carbon fibers, however, usually have a fiber length of approximately 10 μm and a fiber diameter of approximately 100 nm, and thus are relatively large in size for use as a conductivity enhancing agent. It will be difficult to, for example, increase the density of the positive electrode material mixture layer if such carbon fibers are used as a conductivity enhancing agent in the positive electrode, as a result of which it becomes difficult to achieve a higher capacity battery.

In contrast, in the lithium secondary battery positive electrode of the present invention, the positive electrode material mixture layer contains carbon fibers having an average fiber length of 10 nm or more and less than 1000 nm and an average fiber diameter of 1 nm or more and 100 nm or less in an amount ranging from 0.25 mass % or more to 1.5 mass % or less, and it is therefore possible to, for example, increase the density of the positive electrode material mixture layer. Although the reasons for this are not clearly known, it is believed that since the carbon fibers having the above-described size are likely to be well dispersed in the positive electrode material mixture layer and include a large proportion of short fibers, the distance between positive electrode active material particles is reduced, and therefore the components within the positive electrode material mixture layer can be well packed.

Accordingly, with a battery (a lithium secondary battery of the present invention) including the lithium secondary battery positive electrode of the present invention, high capacity can be attained, and the carbon fibers serving as a conductivity enhancing agent are well dispersed, thereby allowing uniform reactions throughout the positive electrode material mixture layer. Accordingly, the area of the positive electrode material mixture layer that is actually involved in the reactions is increased, thereby improving the load characteristics. Moreover, local reactions in the positive electrode material mixture layer are suppressed, thereby suppressing the degradation of the positive electrode during repeated charge/discharge cycling, and therefore the charge/discharge cycle characteristics are also improved.

It is preferable that the carbon fibers have an average fiber length of 30 nm or more and 500 nm or less. Furthermore, it is preferable that the carbon fibers have an average fiber diameter of 3 nm or more and 50 nm or less.

The average fiber length and average fiber diameter of the carbon fibers as used herein are measured from transmission electron micrographs captured with a transmission electron microscope (TEM, for example, JEM series available from JEOL Ltd., H-700H available from Hitachi, Ltd., or the like) at an accelerating voltage of 100 or 200 kV. A TEM micrograph is captured for 100 fiber samples at a magnification of 20,000 to 40,000 in the case of obtaining the average fiber length and at a magnification of 200,000 to 400,000 in the case of obtaining the average fiber diameter, and the length or diameter of each fiber is measured using a first class metal straightedge approved by the Japanese Industrial Standards (JIS). The measured values are averaged, and this is defined as the average fiber length or the average fiber diameter.

As the conductivity enhancing agent, it is also possible to use a conductivity enhancing agent (hereinafter also referred to as a "second conductivity enhancing agent") other than the carbon fibers described above having an average fiber length of 10 nm or more and less than 1000 nm and an average fiber diameter of 1 nm or more and 100 nm or less, together with the carbon fibers. As the second conductivity enhancing agent, conventionally known conductivity enhancing agents used in the lithium secondary battery positive electrodes can be used, such as, for example, carbon materials including: graphites such as natural graphite (flake graphite and the like) and artificial graphite; carbon blacks such as acetylene black, ketjen black, channel black, furnace black, lamp black and thermal black; carbon fibers having an average fiber length of less than 1 nm or 1000 nm or more, and carbon fibers having an average fiber diameter of less than 1 nm or exceeding 100 nm.

In particular, it is preferable to use any of the above-listed graphites together with the carbon fibers having an average fiber length of 10 nm or more and less than 1000 nm and an average fiber diameter of 1 nm or more and 100 nm or less. In this case, the carbon fibers can be better dispersed in the positive electrode material mixture layer, and the load characteristics and the charge/discharge cycle characteristics of the battery including the lithium secondary battery positive electrode of the present invention can be further enhanced.

In the case of using, as the conductivity enhancing agent, any of the above-listed graphites together with the carbon fibers having an average fiber length of 10 nm or more and less than 1000 nm and an average fiber diameter of 1 nm or more and 100 nm or less, it is preferable that the graphite content is 25 mass % or more when the total content of the carbon fibers and the graphite in the positive electrode material mixture layer, is taken as 100 mass %. It is thereby possible to better ensure the effects of combined use of the carbon fibers and the graphite. However, if the amount of graphite is too large relative to the total of the carbon fibers and the graphite in the positive electrode material mixture layer, the conductivity enhancing agent accounts for a large proportion in the positive electrode material mixture layer, and therefore the amount of the positive electrode active material may be reduced and the effect of achieving high capacity may be reduced. Accordingly, the graphite content is preferably 87.5 mass % or less when the total content of the carbon fibers and the graphite in the positive electrode material mixture layer is taken as 100 mass %.

Also, when a second conductivity enhancing agent other than the graphites listed above is used as the conductivity enhancing agent together with the carbon fibers, it is preferable that the content of the second conductivity enhancing agent is 25 mass % or more and 87.5 mass % or less when the total of the carbon fibers and the second conductivity enhancing agent in the positive electrode material mixture layer is taken as 100 mass %.

As the positive electrode active material used in the lithium secondary battery positive electrode of the present invention, conventionally known materials for use in lithium secondary batteries, or in other words, lithium-containing composite oxides capable of absorbing and desorbing Li (lithium) ions can be used. It is preferable to use a lithium-containing composite oxide represented by the following general compositional formula (1) as the positive electrode active material for the lithium secondary battery positive electrode of the present invention because it has a high capacity and excellent thermal stability among lithium-containing composite oxides.

$$Li_{1+x}MO_2 \tag{1}$$

where x is within a range of −0.15≤x≤0.15, and M represents an element group of three or more elements including at least Ni, Co and Mn, and the ratios of Ni, Co and Mn to the total elements constituting M satisfy 45≤a≤90, 5≤b≤30, 5≤c≤30 and 10≤b+c≤55, where the ratios of Ni, Co and Mn are represented by a, b and c, respectively, in units of mol %.

In the lithium-containing composite oxide represented by the general compositional formula (1), Ni is a component that contributes to improving the capacity of the lithium-containing composite oxide.

The ratio a of Ni is preferably 45 mol % or more, and more preferably 50 mol % or more, when the total amount of elements of the element group M in the general compositional formula (1), representing the lithium-containing composite oxide, is taken as 100 mol % from the viewpoint of achieving improved capacity of the lithium-containing composite oxide. However, if the ratio of Ni in the element group M is too large, for example, the amounts of Co and Mn will be small, and the effects of these elements may be reduced. Accordingly, the ratio a of Ni is preferably 90 mol % or less, and more preferably 70 mol % or less, when the total amount of elements of the element group M in the general compositional formula (1), representing the lithium-containing composite oxide, is taken as 100 mol %.

Co contributes to the capacity of the lithium-containing composite oxide and acts to improve the packing density thereof in the positive electrode material mixture layer, but it may cause increased cost and reduced safety if the amount is too large. Accordingly, the ratio b of Co is preferably 5 mol % or more and 30 mol % or less when the total amount of elements of the element group M in the general compositional formula (1), representing the lithium-containing composite oxide, is taken as 100 mol %.

Also, in the lithium-containing composite oxide, the ratio c of Mn is preferably 5 mol % or more and 30 mol % or less when the total amount of elements of the element group M in the general compositional formula (1) is taken as 100 mol %. By including Mn in the above-described amount in the lithium-containing composite oxide so as to have Mn necessarily present in a crystal lattice, the thermal stability of the lithium-containing composite oxide can be increased, and it is thereby possible to obtain an even safer battery.

Furthermore, in the lithium-containing composite oxide, inclusion of Co suppresses variations of Mn valence associated with doping and dedoping of Li during battery charge/discharge and stabilizes the average Mn valence at a value near 4, further increasing reversibility in charge/discharge reactions. Accordingly, by using such a lithium-containing composite oxide, it is possible to obtain a battery having more excellent charge/discharge cycle characteristics.

In the lithium-containing composite oxide, from the viewpoint of well ensuring the effects of combined use of Co and Mn, the sum (b+c) of the ratio b of Co and the ratio c of Mn is preferably 10 mol % or more and 55 mol % or less, and more preferably 50 mol % or less, when the total amount of elements of the element group M in the general compositional formula (1) is taken as 100 mol %.

The element group M in the general compositional formula (1) representing the lithium-containing composite oxide may include an element other than Ni, Co and Mn, such as Ti, Cr, Fe, Cu, Zn, Al, Ge, Sn, Mg, Ag, Ta, Nb, B, P, Zr, Ca, Sr or Ba. However, in order to obtain sufficient effects obtained by inclusion of Ni, Co and Mn in the lithium-containing composite oxide, the total ratio (mol %) of the elements other than Ni, Co and Mn represented by f is preferably 15 mol % or less, and more preferably 3 mol % or less when the total amount of elements of the element group M is taken as 100 mol %.

For example, in the lithium-containing composite oxide, if Al is present within the crystal lattice, the crystal structure of the lithium-containing composite oxide can be stabilized, and the thermal stability of the lithium-containing composite oxide can be improved, and therefore an even safer lithium secondary battery can be obtained. In addition, the presence of Al in the grain boundary and surface of the lithium-containing composite oxide particles can improve the stability over time and suppress side reactions with the electrolyte, and it is therefore possible to obtain a lithium secondary battery having a longer service life.

However, Al cannot contribute to the charge/discharge capacity, and thus if the Al content is increased in the lithium-containing composite oxide, it may cause reduction in capacity. Accordingly, it is preferable that the ratio of Al is 10 mol % or less when the total amount of elements of the element group M in the general compositional formula (1), representing the lithium-containing composite oxide, is taken as 100 mol %. In order to better ensure the effects obtained by inclusion of Al, the ratio of Al is preferably 0.02 mol % or more when the total amount of elements of the element group M in the general compositional formula (1), representing the lithium-containing composite oxide, is taken as 100 mol %.

In the lithium-containing composite oxide, if Mg is present within the crystal lattice, the crystal structure of the lithium-containing composite oxide can be stabilized, and the thermal stability of the lithium-containing composite oxide can be improved, and therefore an even safer lithium secondary battery can be obtained. In addition, when the lithium-containing composite oxide undergoes a phase transformation due to doping and dedoping of Li during charge/discharge of the lithium secondary battery, Mg migrates to Li sites, thereby mitigating the irreversible reaction and increasing the reversibility of the crystal structure of the lithium-containing composite oxide, and it is therefore possible to obtain a lithium secondary battery having a long charge/discharge cycle life. Particularly when the lithium-containing composite oxide has a Li-deficient crystal structure by setting x<0 in the general compositional formula (1) representing the lithium-containing composite oxide, Mg, instead of Li, migrates to Li sites to form the lithium-containing composite oxide, and therefore a stable compound can be obtained.

However, because of a small contribution of Mg to the charge/discharge capacity, if the Mg content is increased in the lithium-containing composite oxide, it may cause reduction in capacity. Accordingly, it is preferable that the ratio of Mg is 10 mol % or less when the total amount of elements of the element group M in the general compositional formula (1), representing the lithium-containing composite oxide, is taken as 100 mol %. In order to better ensure the effects obtained by inclusion of Mg, the ratio of Mg is preferably 0.02 mol % or more when the total amount of elements of the element group M in the general compositional formula (1), representing the lithium-containing composite oxide, is taken as 100 mol %.

If the lithium-containing composite oxide particles contain Ti, it is incorporated in crystal defect sites due to oxygen deficiency or the like in the $LiNiO_2$ type crystal structure and stabilizes the crystal structure, increasing the reversibility in the reaction of the lithium-containing composite oxide, and it is therefore possible to obtain a lithium secondary battery having more excellent charge/discharge cycle characteristics.

In order to well ensure the above effects, the ratio of Ti is preferably 0.01 mol % or more, and more preferably 0.1 mol % or more when the total amount of elements of the element group M in the general compositional formula (1), representing the lithium-containing composite oxide, is taken as 100 mol %. However, if the Ti content is too large, because Ti is not involved in charge/discharge reactions, it may cause reduction in capacity or be likely to form a heterogeneous phase such as $Li_2TiO_3$, leading to characteristic degradation. Accordingly, the ratio of Ti is preferably 10 mol % or less, more preferably 5 mol % or less, and even more preferably 2 mol % or less when the total amount of elements of the element group M in the general compositional formula (1), representing the lithium-containing composite oxide, is taken as 100 mol %.

The following effects can be obtained in the case where the lithium-containing composite oxide contains at least one element M' selected from Ge, Ca, Sr, Ba, B, Zr and Ga as the element group M in the general compositional formula (1), and thus it is preferable to include the element M'.

In the case where the lithium-containing composite oxide contains Ge, the crystal structure of the composite oxide after Li has been desorbed is stabilized, and therefore the reversibility in the charge/discharge reactions can be increased and a lithium secondary battery having more excellent charge/discharge cycle characteristics can be obtained. Particularly when Ge is present in the grain boundary and surface of the lithium-containing composite oxide particles, crystal structural disorder at the interface due to Li intercalation and de-intercalation can be suppressed, greatly contributing to improving the charge/discharge cycle characteristics.

In the case where the lithium-containing composite oxide contains an alkaline-earth metal such as Ca, Sr or Ba, the growth of primary particles is promoted and the crystallinity of the lithium-containing composite oxide is improved, and it is therefore possible to reduce active sites, improve the stability over time when used as a coating material (positive electrode material mixture-containing composition, which will be described later) for forming a positive electrode material mixture layer, and suppress irreversible reactions with the non-aqueous electrolyte in the lithium secondary battery. Furthermore, the presence of these elements in the grain boundary and surface of the lithium-containing composite oxide particles enables trapping of $CO_2$ gas within the battery, and it is therefore possible to obtain a long service life lithium secondary battery having more excellent storage characteristics. Particularly when the lithium-containing composite oxide contains Mn, there is a tendency that primary particles cannot easily grow, and it is therefore more effective to add an alkaline-earth metal such as Ca, Sr or Ba.

Even in the case where the lithium-containing composite oxide contains B, the growth of primary particles is promoted and the crystallinity of the lithium-containing composite oxide is improved, and it is therefore possible to reduce active sites, and suppress irreversible reactions with atmospheric moisture, the binder used to form a positive electrode material mixture layer and the non-aqueous electrolyte in the battery. Accordingly, the stability over time when used as a coating material for forming a positive electrode material mixture layer can be improved, and the generation of gas within the battery can be suppressed, and it is therefore possible to obtain a long service life lithium secondary battery having more excellent storage characteristics. Particularly when the lithium-containing composite oxide contains Mn, there is a tendency that primary particles cannot easily grow, and it is therefore more effective to add B.

In the case where the lithium-containing composite oxide contains Zr, due to the presence of Zr in the grain boundary and surface of the lithium-containing composite oxide particles, the surface activity is suppressed without compromising the electrochemical characteristics of the lithium-containing composite oxide, and it is therefore possible to obtain a long service life lithium secondary battery having more excellent storage characteristics.

In the case where the lithium-containing composite oxide contains Ga, the growth of primary particles is promoted and the crystallinity of the lithium-containing composite oxide is improved, and it is therefore possible to reduce active sites, improve the stability over time when used as a coating material for forming a positive electrode material mixture layer, and suppress irreversible reactions with the non-aqueous electrolyte. Also, by incorporating Ga within the crystal structure of the lithium-containing composite oxide in the form of a solid solution, the interlayer spacing of the crystal lattice can be expanded, and the percentage of expansion/contraction of the lattice due to Li intercalation and de-intercalation can be reduced. Accordingly, the reversibility of the crystal structure can be increased, and it is therefore possible to obtain a lithium secondary battery having a long charge/discharge cycle life. Particularly when the lithium-containing composite oxide contains Mn, there is a tendency that primary particles cannot easily grow, and it is therefore more effective to add Ga.

In order to easily obtain the effects of the element M' selected from Ge, Ca, Sr, Ba, B, Zr and Ga, the ratio of the element M' is preferably 0.1 mol % or more in all of the elements of the element group M. Also, the ratio of the element M' in all of the elements of the element group M is preferably 10 mol % or less.

The elements of the element group M other than Ni, Co and Mn may be distributed uniformly in the lithium-containing composite oxide, or may be segregated to the particle surface or the like.

In the general compositional formula (1) representing the lithium-containing composite oxide, when the ratio b of Co and the ratio c of Mn in the element group M satisfy the relationship: b>c, the growth of the lithium-containing composite oxide particles is promoted, the packing density of the particles in the positive electrode (positive electrode material mixture layer in the positive electrode) is increased, a lithium-containing composite oxide having higher reversibility can be obtained, and thereby a further increase can be expected in the capacity of the battery including such a positive electrode.

On the other hand, in the general compositional formula (1) representing the lithium-containing composite oxide, when the ratio b of Co and the ratio c of Mn in the element group M satisfy the relationship: b≤c, a lithium-containing composite oxide having higher thermal stability can be obtained, and a further increase in the safety of the battery including such an electrode can be expected.

The lithium-containing composite oxide having the above-described composition has a true density as large as 4.55 g/cm$^3$ or more and 4.95 g/cm$^3$ or less, and thus is a material having a high volume energy density. This is presumably because the true density of the lithium-containing composite oxide containing Mn within a predetermined range changes significantly according to the composition of the lithium-containing composite oxide, but with a narrow composition range as described above, the structure is stabilized and uniformity is increased, and thus the true density takes a large value close to, for example, the true density of $LiCoO_2$. Also, the capacity per mass of the lithium-containing composite oxide can be increased, and a material having excellent reversibility can be obtained.

The lithium-containing composite oxide has a large true density particularly when it has a composition close to the stoichiometric ratio. Specifically, in the general compositional formula (1), x preferably is within the range of −0.15≤x≤0.15. By adjusting the value of x within this range, increased true density and reversibility can be obtained. More preferably, x is −0.05 or more and 0.05 or less. In this case, the lithium-containing composite oxide can have a true density as high as 4.6 g/cm$^3$ or more.

The lithium-containing composite oxide represented by the general compositional formula (1) can be produced by, for example, mixing a Li-containing compound (lithium hydroxide monohydrate or the like), a Ni-containing compound (nickel sulfate or the like), a Co-containing compound (cobalt sulfate or the like), a Mn-containing compound (manganese sulfate or the like) and a compound containing another element of the element group M (aluminum sulfate, magnesium sulfate or the like), and baking the mixture. In order to synthesize the lithium-containing composite oxide with a higher purity, it is preferable to mix a composite compound (hydroxide, oxide or the like) containing a plurality of elements of the element group M with a Li-containing compound and bake the mixture.

As the baking conditions, for example, the baking temperature can be set within the range of 800° C. or more and 1050° C. or less, and the baking time can be set to 1 to 24 hours. It is preferable to temporarily heat the mixture to a temperature (for example, within the range of 250° C. or more and 850° C. or less) lower than the baking temperature, maintain the temperature for preheating, and then increase the temperature to the baking temperature to proceed the reaction. There is no particular limitation on the preheating time, and the preheating time is usually set to approximately 0.5 to 30 hours. The baking atmosphere can be an oxygen-containing atmosphere (or in other words, in the atmospheric air), a mixed atmosphere of an inert gas (argon, helium, nitrogen or the like) and an oxygen gas, an oxygen gas atmosphere, or the like. In this case, the oxygen concentration (volume basis) is preferably 15% or more, and more preferably 18% or more.

As the positive electrode active material contained in the lithium secondary battery positive electrode of the present invention, a lithium-containing composite oxide other than the lithium-containing composite oxide represented by the general compositional formula (1) may be used. Examples of such lithium-containing composite oxides include lithium cobalt oxides such as $LiCoO_2$; lithium manganese oxides such as $LiMnO_2$ and $Li_2MnO_3$; lithium nickel oxides such as $LiNiO_2$; layer-structured lithium-containing composite oxides such as $LiCo_{1-x}NiO_2$; spinel-structured lithium-containing composite oxides such as $LiMn_2O_4$ and $Li_{4/3}Ti_{5/3}O_4$; olivine-structured lithium-containing composite oxides such as $LiFePO_4$; and the above-listed oxides partially substituted with various elements.

As the positive electrode active material, the oxides listed above including the lithium-containing composite oxide represented by the general compositional formula (1) may be used alone or in a combination of two or more. However, as described above, it is preferable to use at least the lithium-containing composite oxide represented by the general compositional formula (1), and it is more preferable to use only the lithium-containing composite oxide represented by the general compositional formula (1) or use the lithium-containing composite oxide represented by the general compositional formula (1) together with $LiCoO_2$.

In the case where the lithium-containing composite oxide represented by the general compositional formula (1) is used together with another lithium-containing composite oxide, from the viewpoint of better ensuring the effects obtained by using the lithium-containing composite oxide represented by the general compositional formula (1), the ratio of the other lithium-containing composite oxide is desirably 90 mass % or less and more desirably 80 mass % or less of the entire active material.

As the binder used in the positive electrode, for example, polyvinylidene fluoride (PVDF), polytetrafluoroethylene (PTFE), styrene butadiene rubber (SBR), carboxymethyl cellulose (CMC) and the like are preferably used.

The positive electrode is produced by, for example, preparing a positive electrode material mixture-containing composition in the form of a paste or slurry in which a positive electrode active material, a binder and a conductivity enhancing agent are dispersed in a solvent such as N-methyl-2-pyrrolidone (NMP) (the binder may be dissolved in the solvent), applying the positive electrode material mixture-containing composition on one or both sides of a current collector, drying the current collector, and optionally calendering the current collector. However, the positive electrode production method is not limited to the above method, and it is possible to use any other production method.

The positive electrode material mixture layer has a thickness of, for example, 10 μm or more and 100 μm or less per side of the current collector, and the positive electrode material mixture layer preferably has a density (calculated from the thickness and mass per unit area of the positive electrode material mixture layer laminated on the current collector) of 3.0 g/cm$^3$ or more and 4.5 g/cm$^3$ or less. As the composition of the positive electrode material mixture layer, for example, the amount of the positive electrode active material is preferably 60 mass % or more and 95 mass % or less, the amount of the binder is preferably 1 mass % or more and 15 mass % or less, and the amount of the conductivity enhancing agent is preferably 3 mass % or more and 20 mass % or less.

As the current collector, a conventionally known current collector used in the positive electrode in lithium secondary batteries can be used, and it is preferable to use, for example, an aluminum foil having a thickness of 10 μm or more and 30 μm or less.

Lithium Secondary Battery of the Present Invention

The lithium secondary battery of the present invention will be described next.

The lithium secondary battery of the present invention only needs to include the lithium secondary battery positive electrode of the present invention, and there is no particular limitation on the configuration and structure, and any conventionally known configuration and structure employed in lithium secondary batteries can be used.

As the negative electrode included in the lithium secondary battery of the present invention, it is possible to use a negative electrode including a negative electrode material mixture layer containing a negative electrode active material, a binder and the like provided on one or both sides of a current collector.

Examples of the negative electrode active material include: carbon materials such as graphite (natural graphite; artificial graphite obtained by graphitizing graphitizable carbon such as pyrolytic carbon, mesocarbon microbeads and carbon fibers at 2800° C. or more; and the like), pyrolytic carbon, coke, glassy carbon, baked products of organic polymer compounds, carbon fibers, activated carbon; metals capable of being alloyed with lithium (Si, Sn and the like) and materials including such metals (alloy and the like).

Among the negative electrode active materials listed above, in terms of further increasing the capacity of the battery, it is preferable to use a material containing Si, more specifically, a material containing Si and O as constituent elements in which the atomic ratio x of O to Si satisfies $0.5 \leq x \leq 1.5$ (hereinafter, this material is referred to as "SiO$_x$").

SiO$_x$ may contain microcrystalline or amorphous phase Si. In this case, the atomic ratio of O to Si is the ratio including Si microcrystals or amorphous phase Si. In other words, SiO$_x$ only needs to have a structure in which Si (for example, microcrystalline Si) is dispersed in an amorphous SiO$_2$ matrix, and the atomic ratio x satisfies $0.5 \leq x \leq 1.5$ including the amorphous SiO$_2$ and the Si dispersed in the amorphous SiO$_2$. For example, in the case of a material having the structure in which Si is dispersed in the amorphous SiO$_2$ matrix and a molar ratio of SiO$_2$ to Si of 1:1, because x=1, the structural formula is expressed by SiO. In the case of the material having such a structure, for example, no peak indicating the presence of Si (microcrystalline Si) may be observed by X ray diffractometry, but the presence of fine Si can be confirmed with a transmission electron microscope.

It is preferable that SiO$_x$ forms a composite with a conductive material such as a carbon material, and it is desirable that, for example, the SiO$_x$ surface is covered with the conductive material (carbon material or the like). As described above, because SiO$_x$ has poor conductivity, when it is used as a negative electrode active material, it is necessary to form an excellent conductive network by using a conductive material (conductivity enhancing agent) and providing good mixing/dispersion of SiO$_x$ and the conductive material within the negative electrode from the viewpoint of ensuring good battery characteristics. With a composite of SiO$_x$ with a conductive material, for example, a better conductive network is formed in the negative electrode than when a material obtained by simply mixing SiO$_x$ and a conductive material is used.

As the composite of SiO$_x$ with a conductive material, in addition to the composite in which the SiO$_x$ surface is covered with a conductive material (preferably a carbon material) described above, granules of SiO$_x$ and a conductive material (preferably a carbon material) can be used.

By further forming a composite using the composite in which the SiO$_x$ surface is covered with a conductive material (preferably a carbon material) and a conductive material (a carbon material or the like) and using the formed composite, an even better conductive network can be formed in the negative electrode, and it is therefore possible to attain a lithium secondary battery having a higher capacity and more excellent battery characteristics (for example, charge/discharge cycle characteristics). As the composite of a conductive material with SiO$_x$ covered with a conductive material, for example, granules obtained by granulating a mixture of SiO$_x$ covered with a conductive material and a conductive material can be used.

As the SiO$_x$ whose surface is covered with a conductive material, a composite (for example, granules) of SiO$_x$ and a conductive material having a specific resistance smaller than that of SiO$_x$ can be used, and preferably, a composite obtained by further covering the surface of the composite of SiO$_x$ with a carbon material can be preferably used. When SiO$_x$ and the conductive material are dispersed within the granules, a better conductive network can be formed. Accordingly, battery characteristics such as heavy load discharge characteristics can be further improved in the lithium secondary battery having the negative electrode containing SiO$_x$ as a negative electrode active material.

As the conductive material that can be used to form a composite with $SiO_x$, for example, it is preferable to use a carbon material such as graphite, low crystalline carbon, carbon nanotubes, and vapor-phase grown carbon fibers.

More specifically, the conductive material is preferably at least one selected from the group consisting of a fibrous or coiled carbon material, a fibrous or coiled metal, carbon black (including acetylene black and ketjen black), artificial graphite, graphitizable carbon and non-graphitizable carbon. The fibrous or coiled carbon material and the fibrous or coiled metal are preferable in that a conductive network can be easily formed and the surface area is large. Carbon black (including acetylene black and ketjen black), artificial graphite, graphitizable carbon and non-graphitizable carbon are preferable in that they have high conductivity and a high electrolyte-retaining ability and can easily maintain contact with $SiO_x$ particles even if the $SiO_x$ particles expand and contract due to charge and discharge of the battery.

Among the conductive materials listed above, it is particularly preferable to use a fibrous carbon material in the case of the $SiO_x$ composite being in the form of granules. This is because the fibrous carbon material has a thin thread-like shape and is highly flexible, and thus it can follow expansion and contraction of $SiO_x$ due to charge and discharge of the battery, and also because the fibrous carbon material has a large bulk density, and thus it can have a large number of contact points with the $SiO_x$ particles. Examples of the fibrous carbon include polyacrylonitrile (PAN)-based carbon fibers, pitch-based carbon fibers, vapor-phase grown carbon fibers and carbon nanotubes, and any of these can be used.

The fibrous carbon material and the fibrous metal may be formed on the surface of $SiO_x$ particles by, for example, a vapor phase method.

$SiO_x$ usually has a specific resistance of $10^3$ KΩcm or more and $10^7$ kΩcm or less, whereas the conductive materials listed above usually have a specific resistance of $10^{-5}$ kΩcm or more and 10 kgΩcm or less.

The composite of $SiO_x$ with a conductive material may further include a material layer (a material layer containing non-graphitizable carbon) covering the carbon material-covering layer on the particle surface.

In the case where the composite of $SiO_x$ with a conductive material is used in the negative electrode, from the viewpoint of well exhibiting the action of forming a composite with a conductive material, the ratio of the conductive material is preferably 5 parts by mass or more, and more preferably 10 parts by mass or more based on 100 parts by mass of $SiO_x$. In the above-described composite, if the proportion of the conductive material that forms a composite with $SiO_x$ is too high, it leads to reduction of the amount of $SiO_x$ in the negative electrode material mixture layer, and the effect of achieving high capacity may become small. Accordingly, the amount of the conductive material is preferably 50 parts by mass or less, and more preferably 40 parts by mass or less based on 100 parts by mass of $SiO_x$.

The composite of $SiO_x$ with a conductive material can be obtained by, for example, the following method.

First, a production method in the case of forming a composite using $SiO_x$ will be described. A dispersion in which $SiO_x$ is dispersed in a dispersing medium is prepared, and the dispersion is sprayed and dried to produce composite particles including a plurality of particles. As the dispersing medium, for example, ethanol or the like can be used. Usually, it is appropriate that the dispersion is sprayed in an atmosphere of 50° C. or more and 300° C. or less. The same composite particles can be produced by methods other than the above-described method, such as a mechanical granulation method using a vibrating or planetary ball mill or rod mill.

In the case of producing granules made of $SiO_x$ and a conductive material having a specific resistance smaller than that of $SiO_x$, the composite particles (granules) can be produced by performing the same method as that for forming a composite containing $SiO_x$, with the use of a dispersion obtained by adding the conductive material to a dispersion in which $SiO_x$ is dispersed in a dispersing medium. Also, the granules of $SiO_x$ and a conductive material can be produced by a granulation method similar to the mechanical granulation method described above.

Next, in the case of forming a composite by covering the surface of $SiO_x$ particles ($SiO_x$ composite particles, or granules made of $SiO_x$ and a conductive material) with a carbon material, for example, $SiO_x$ particles and a hydrocarbon-based gas are heated in a vapor phase so as to cause carbon produced by pyrolytic decomposition of the hydrocarbon-based gas to deposit on the particle surface. With the vapor phase growth (CVD) method as described above, the hydrocarbon-based gas can be distributed throughout the composite particles, and a thin and uniform coating (carbon material-covering layer) containing a conductive carbon material can be formed on the particle surface and in the surface pores. Accordingly, conductivity can be imparted uniformly to the $SiO_x$ particles with the use of a small amount of carbon material.

In the production of the $SiO_x$ covered with a carbon material, the processing temperature (atmospheric temperature) of the vapor phase growth (CVD) method varies depending on the type of hydrocarbon-based gas, but usually a temperature of 600° C. or more and 1200° C. or less is appropriate. Particularly, the processing temperature is preferably 700° C. or more, and more preferably 800° C. or more. This is because a high processing temperature causes less residual impurities and can form a covering layer containing a highly conductive carbon.

As a liquid source for hydrocarbon-based gas, toluene, benzene, xylene, mesitylene or the like can be used, but toluene is particularly preferable because it is easy to handle. A hydrogen gas can be obtained by vaporizing any of these (by for example, bubbling with a nitrogen gas). It is also possible to use a methane gas, an acetylene gas or the like.

After the surface of $SiO_x$ particles ($SiO_x$ composite particles, or granules made of $SiO_x$ and a conductive material) has been covered with a carbon material by the vapor phase growth (CVD) method, at least one organic compound selected from the group consisting of a petroleum-based pitch, a coal-based pitch, a thermosetting resin, and a condensate of naphthalene sulphonate with an aldehyde may be attached to the covering layer containing a carbon material and the particles having the organic compound attached thereto may be baked.

Specifically, a dispersion in which $SiO_x$ particles ($SiO_x$ composite particles, or granules made of $SiO_x$ and a conductive material) covered with a carbon material and the organic compound are dispersed in a dispersing medium is prepared, and the dispersion is sprayed and dried to form particles covered with the organic compound, and the particles covered with the organic compound are baked.

The pitch can be an isotropic pitch, and the thermosetting resin can be a phenolic resin, a furan resin, a furfural resin or the like. The condensate of naphthalene sulphonate with an aldehyde can be a naphthalene sulphonate formaldehyde condensate.

The dispersing medium for dispersing the $SiO_x$ particles covered with a carbon material and the organic compound can be, for example, water or an alcohol (ethanol or the like). Usually, it is appropriate that the dispersion is sprayed in an atmosphere of 50° C. or more and 300° C. or less. It is appropriate that the baking temperature is usually 600° C. or more and 1200° C. or less, but the baking temperature is preferably 700° C. or more, and more preferably 800° C. or more. This is because a high processing temperature causes less residual impurities and can form a covering layer containing a highly conductive and good quality carbon. It should be noted, however, that the processing temperature has to be less than or equal to the melting point of $SiO_x$.

The negative electrode containing $SiO_x$ can provide a high capacity, but the volume of $SiO_x$ changes significantly due to charge and discharge. Accordingly, if the amount of $SiO_x$ in the negative electrode (in the negative electrode material mixture layer) is large, for example, there is a possibility that the negative electrode might be degraded due to repetition of charge and discharge of the battery. For this reason, $SiO_x$ may be used together with another negative electrode active material, whereby the amount of $SiO_x$ in the negative electrode material mixture layer can be reduced and the degradation of the negative electrode resulting from the volume change of $SiO_x$ due to charge and discharge can be suppressed, and at the same time, the capacity reduction due to reduction of the amount of $SiO_x$ can be suppressed as much as possible. As the other negative electrode active material used together with $SiO_x$, it is preferable to use a carbon material among the materials listed above, and particularly preferable to use graphite.

As a binder for use in the negative electrode, any of the binders listed for use as a binder in the positive electrode can be used. Furthermore, a conductivity enhancing agent may be added to the negative electrode material mixture layer, such as a carbon black such as acetylene black, carbon nanotubes, or the carbon fibers having an average fiber length of 10 nm or more and less than 1000 nm and an average fiber diameter of 1 nm or more and 100 nm or less used in the positive electrode.

The negative electrode can be produced by, for example, preparing a negative electrode material mixture-containing composition in which a negative electrode active material, a binder and optionally a conductivity enhancing agent are dispersed in a solvent such as NMP or water (the binder may be dissolved in the solvent), applying the negative electrode material mixture-containing composition on one or both sides of a current collector, drying the current collector, and optionally calendering the current collector. However, the negative electrode production method is not limited to the above method, and it is possible to use any other production method.

The negative electrode material mixture layer preferably has a thickness of 10 μm or more and 100 μm or less per side of the current collector, and the negative electrode material mixture layer preferably has a density (calculated from the thickness and mass per unit area of the negative electrode material mixture layer laminated on the current collector) of 1.0 g/cm³ or more and 1.9 g/cm³ or less. As the composition of the negative electrode material mixture layer, for example, the amount of the negative electrode active material is preferably 80 mass % or more and 95 mass % or less, the amount of the binder is preferably 1 mass % or more and 20 mass % or less, and in the case of using a conductivity enhancing agent, the amount is preferably 1 mass % or more and 10 mass % or less.

As the negative electrode current collector, a copper or nickel foil, a punched metal sheet, a mesh, an expanded metal or the like can be used, but usually, a copper foil is used. In the case of reducing the total thickness of the negative electrode in order to obtain a high energy density battery, the upper limit thickness of the negative electrode current collector is preferably 30 μm, and in order to ensure the mechanical strength, the lower limit is desirably 5 μm.

In the lithium secondary battery of the present invention, it is preferable that the ratio P/N of the mass P of the positive electrode active material to the mass N of the negative electrode active material is 3.6 or less. This reduces the utilization ratio of the negative electrode active material and limits the charging electric capacity, whereby, for example, in the case of using a negative electrode active material whose volume changes significantly due to charge and discharge, such as $SiO_x$, the volume change can be suppressed, and reduction of the effects of improving the charge/discharge cycle characteristics of the battery due to pulverization of the active material particles or the like can be suppressed. However, if the P/N ratio is too small, the effects of increasing the capacity of the battery may be reduced. Accordingly, the P/N ratio is preferably 1.0 or more.

In the battery containing the composite of $SiO_x$ with a carbon material, the P/N ratio is calculated assuming that the amount of the carbon material contained in the composite is regarded as included in the mass N of the negative electrode active material.

As the non-aqueous electrolyte contained in the lithium secondary battery of the present invention, a solution in which a lithium salt is dissolved in an organic solvent is used. There is no particular limitation on the lithium salt as long as it can dissociate into $Li^+$ ions in the solvent and does not easily cause a side reaction, such as decomposition, in a voltage range in which the battery is used. Examples for use include: inorganic lithium salts such as $LiClO_4$, $LiPF_6$, $LiBF_4$, $LiAsF_6$ and $LiSbF_6$; and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($2 \leq n \leq 7$) and $LiN(RfOSO_2)_2$, where Rf is a fluoroalkyl group.

The concentration of the lithium salt in the non-aqueous electrolyte is preferably 0.5 mol/L or more and 1.5 mol/L or less, and more preferably 0.9 mol/L or more and 1.25 mol/L or less.

There is no particular limitation on the organic solvent used in the non-aqueous electrolyte as long as it can dissolve the above-listed lithium salts and does not cause a side reaction, such as decomposition, in a voltage range in which the battery is used. Examples include: cyclic carbonates such as ethylene carbonate, propylene carbonate and butylene carbonate; linear carbonates such as dimethyl carbonate, diethyl carbonate and methyl ethyl carbonate; linear esters such as methyl propionate; cyclic esters such as γ-butyrolactone; linear ethers such as dimethoxyethane, diethyl ether, 1,3-dioxolane, diglyme, triglyme and tetraglyme; cyclic ethers such as dioxane, tetrahydrofuran and 2-methyltetrahydrofuran; nitriles such as acetonitrile, propionitrile and methoxy propionitrile; and sulfite esters such as ethylene glycol sulfite. These may be used in a combination of two or more. In order to obtain a battery with good characteristics, it is desirable to use a combination that can provide a high conductivity such as a solvent mixture of an ethylene carbonate and a linear carbonate.

In the case where $SiO_x$ described above is used as a negative electrode active material, it is preferable to use a non-aqueous electrolyte containing 4-fluoro-1,3-dioxolane-2-one (FEC) and vinylene carbonate (VC).

In the battery containing $SiO_x$ as a negative electrode active material, the $SiO_x$ particles may be pulverized by expansion and contraction of the volume of $SiO_x$ due to charge and discharge. When the SiO$_x$ particles are pulverized, highly active Si within the SiO$_x$ particles is exposed, and this may cause decomposition of the non-aqueous electrolyte and reduce the effects of improving the charge/discharge cycle characteristics of the battery.

However, if a battery is fabricated using a non-aqueous electrolyte containing FEC, an FEC-derived coating will be formed on the new surface created by pulverization of SiO$_x$, and the reaction with the non-aqueous electrolyte can be suppressed. Also, if the non-aqueous electrolyte contains VC in addition to FEC, a coating of better properties will be formed on the new surface of SiO$_x$, and the reaction between the negative electrode active material and the non-aqueous electrolyte can be well suppressed. Accordingly, it is possible to obtain a lithium secondary battery having more excellent charge/discharge cycle characteristics while ensuring a high capacity.

As for the FEC content and the VC content in the non-aqueous electrolyte used in the battery (the non-aqueous electrolyte used when assembling the battery, the same applies hereinafter), from the viewpoint of better ensuring the effects obtained by including FEC and VC, the FEC content is preferably 0.1 mass % or more, and the VC content is preferably 0.1 mass % or more. However, if the amount of FEC or the amount of VC is too large in the non-aqueous electrolyte, the activity of SiO$_x$, serving as the negative electrode active material, may be reduced, or excessive gas generation may occur when the coating is formed, causing bulging of the battery outer case. Accordingly, in the non-aqueous electrolyte used in the battery, the FEC content is preferably 10 mass % or less, and the VC content is preferably 10 mass % or less.

For the purpose of further improving charge/discharge cycle characteristics and improving safety such as high temperature storage characteristics and overcharge protection, additives such as acid anhydride, sulfonic acid ester, dinitrile, 1,3-propane sultone, diphenyl disulfide, cyclohexylbenzene, biphenyl, fluorobenzene, and t-butyl benzene (including derivatives thereof) may be added as appropriate to the non-aqueous electrolyte used in the battery.

The separator included in the lithium secondary battery of the present invention preferably has a property (or in other words, a shutdown function) that closes the pores at 80° C. or more (more preferably 100° C. or more) and 170° C. or less (more preferably 150° C. or less), and it is possible to use a separator normally used in lithium secondary batteries and the like, such as a microporous film made of a polyolefin such as polyethylene (PE) or polypropylene (PP). The microporous film constituting the separator may be a microporous film made of, for example, only PE or only PP, or may be a laminate of a PE microporous film and a PP microporous film.

As the separator included in the battery of the present invention, it is preferable to use a laminated type separator including a porous layer (I) composed mainly of a resin having a melting point of 140° C. or less and a porous layer (II) composed mainly of a resin that does not melt at a temperature of 150° C. or less or an inorganic filler having a heat resistance temperature of 150° C. or more. As used herein, "melting point" means a melting temperature measured with a differential scanning calorimeter (DSC) in accordance with JIS K 7121. Also, the expression "not melt at a temperature of 150° C. or less" means that no melting behavior is observed at a temperature of 150° C. or less during melting temperature measurement, such that the measuring temperature measured with a DSC in accordance with JIS K 7121 is above 150° C. Furthermore, the expression "a heat resistance temperature of 150° C. or more" means that no deformation such as softening is observed at least 150° C.

The porous layer (I) included in the laminated type separator is a layer provided mainly to ensure the shutdown function, and thus, if the lithium secondary battery reaches the melting point of the resin that is a main component of the porous layer (I), the resin contained in the porous layer (I) melts and closes the pores of the separator, causing a shutdown that suppresses the progress of the electrochemical reaction.

The resin having a melting point of 140° C. or less used as a main component of the porous layer (I) can be, for example, PE, and used in a form obtained by applying a dispersion containing PE particles on a substrate, such as a microporous film or a non-woven fabric, used in the lithium secondary battery and drying the substrate. In the total of the constituent components of the porous layer (I), the volume of the resin having a melting point of 140° C. or less used as a main component is 50 vol % or more, and more preferably 70 vol % or more. In the case of forming the porous layer (I) using a PE microporous film described above, the volume of the resin having a melting point of 140° C. or less is 100 vol %.

The porous layer (II) included in the laminated type separator has a function that prevents short-circuiting caused by direct contact between the positive electrode and the negative electrode, even if the internal temperature of the lithium secondary battery rises high. The function is ensured by the resin that does not melt at a temperature of 150° C. or less or the inorganic filler having a heat resistance temperature of 150° C. or more. In other words, when the battery temperature rises high, even if the porous layer (I) shrinks, the porous layer (II) that is less susceptible to shrinkage can prevent short-circuiting caused by direct contact between the positive and negative electrodes that can occur as a result of thermal shrinkage of the separator. Also, the heat resistant porous layer (II) acts as a framework for the separator, and therefore thermal shrinkage of the porous layer (I), or in other words, the overall thermal shrinkage of the separator can be suppressed as well.

In the case of forming the porous layer (II) using a resin having a melting point of 150° C. or more as a main component, for example, it can be used in a form in which a microporous film made of a resin that does not melt at a temperature of 150° C. or less (for example, a PP microporous film for use in batteries described above) is laminated on the porous layer (I) or in an applied/laminated type form in which a dispersion containing particles of the resin that does not melt at a temperature of 150° C. or less and the like is applied to the porous layer (I) and dried to form a porous layer (II) on the surface of the porous layer (I).

Examples of the resin that does not melt at a temperature of 150° C. or less include: PP; various crosslinked polymeric fine particles such as crosslinked polymethyl methacrylate, crosslinked polystyrene, crosslinked poly(divinyl benzene), a crosslinked styrene-divinyl benzene copolymer, polyimide, melamine resin, phenolic resin, a benzoguanamine-formaldehyde condensate; polysulfone; poly(ether sulfone); polyphenylene sulfide; polytetrafluoroethylene; polyacrylonitrile; aramid; and polyacetal.

In the case of using particles of the resin that does not melt at a temperature of 150° C. or less, the particles preferably have an average particle size of 0.01 µm or more, and more preferably 0.1 µm or more, and preferably 10 µm or less, and more preferably 2 µm or less. The average particle size of particles as used herein refers to the average particle size $D_{50\%}$ measured with, for example, a laser scattering particle size distribution analyzer (for example, LA-920 available from Horiba, Ltd.) by dispersing the fine particles in a medium that does not dissolve the resin.

In the case of forming the porous layer (II) using an inorganic filler having a heat resistance temperature of 150° C. or more as a main component, for example, it can be used in an applied/laminated type form in which a dispersion containing the inorganic filler having a heat resistance temperature of 150° C. or more and the like is applied to the porous layer (I) and dried to form a porous layer (II) thereon.

The inorganic filler contained in the porous layer (II) can be any inorganic filler as long as it has a heat resistance temperature of 150° C. or more, is stable in the non-aqueous electrolyte in the battery, and cannot easily undergo reduction oxidation in the battery operating voltage range and is electrochemically stable. From the viewpoint of dispersibility and the like, the inorganic filler is preferably fine particles, and is preferably alumina, silica or boehmite. Alumina, silica and boehmite have high oxidation resistance, and the particle size and shape can be adjusted to desired values, and therefore the porosity of the porous layer (II) can be easily controlled with high accuracy. As the inorganic filler having a heat resistance temperature of 150° C. or more, for example, the above-listed materials may be used alone or in a combination of two or more. The inorganic filler having a heat resistance temperature of 150° C. or more may be used together with the resin that does not melt at a temperature of 150° C. or less described above.

There is no particular limitation on the shape of the inorganic filler having a heat resistance temperature of 150° C. or more contained in the porous layer (II), and the inorganic filler can have any shape such as a substantially spherical shape (including a perfectly spherical shape), a substantially ellipsoid shape (including an ellipsoid shape), and a platy shape.

The inorganic filler having a heat resistance temperature of 150° C. or more contained in the porous layer (II) preferably has an average particle size of 0.3 µm or more, and more preferably 0.5 µm or more because if the inorganic filler is too small, the ion permeability decreases. Also, if the inorganic filler having a heat resistance temperature of 150° C. or more is too large, the electrical characteristics will be easily deteriorated. Accordingly, the average particle size is preferably 5 µm or less, and more preferably 2 µm or less.

In the porous layer (II), the resin that does not melt at a temperature of 150° C. or less and the inorganic filler having a heat resistance temperature of 150° C. or more are predominantly contained in the porous layer (II), and therefore the amount thereof in the porous layer (II) (the amount of either one of the resin that does not melt at a temperature of 150° C. or less or the inorganic filler having a heat resistance temperature of 150° C. or more in the case where the porous layer (II) contains either one of them, or the total amount of the resin that does not melt at a temperature of 150° C. or less and the inorganic filler having a heat resistance temperature of 150° C. or more in the case where the porous layer (II) contains both, the same applies hereinafter to the amount of resin that does not melt at a temperature of 150° C. or less and the inorganic filler having a heat resistance temperature of 150° C. or more in the porous layer (II)) is 50 vol % or more, preferably 70 vol % or more, more preferably 80 vol % or more, and even more preferably 90 vol % or more in the total volume of the constituent components of the porous layer (II). A high content of the inorganic filler in the porous layer (II) as described above can well suppress the overall thermal shrinkage of the separator even if the temperature of the lithium secondary battery rises high, and the occurrence of short-circuiting caused by direct contact between the positive electrode and the negative electrode can be better suppressed.

As will be described later, it is preferable that the porous layer (II) contains an organic binder, and therefore the amount of the resin that does not melt at a temperature of 150° C. or less and the inorganic filler having a heat resistance temperature of 150° C. or more in the porous layer (II) is preferably 99.5 vol % or less in the total volume of the constituent components of the porous layer (II).

The porous layer (II) preferably contains an organic binder in order to bind the particles of the resin that does not melt at a temperature of 150° C. or less or the inorganic filler having a heat resistance temperature of 150° C. or more, or to integrate the porous layer (II) and the porous layer (I). Examples of the organic binder include an ethylene-vinyl acetate copolymer (EVA containing a vinyl acetate-derived structural unit in an amount of 20 mol % or more and 35 mol % or less), an ethylene-acrylic acid copolymer such as an ethylene-ethyl acrylate copolymer (EEA), fluorine-based rubber, SBR, CMC, hydroxyethyl cellulose (HEC), poly(vinyl alcohol) (PVA), poly(vinyl butyral) (PVB); poly(vinyl pyrrolidone) (PVP), crosslinked acrylic resin, polyurethane, and epoxy resin. In particular, a heat resistant binder having a heat resistance temperature of 150° C. or more is preferably used. The organic binders listed above may be used alone or in a combination of two or more.

Among the organic binders listed above, it is preferable to use highly flexible binders such as EVA, an ethylene-acrylic acid copolymer, a fluorine-based rubber and SBR. Specific examples of such highly flexible organic binders include Evaflex series (EVA) available from DuPont-Mitsui Polychemicals Co., Ltd., EVA available from Nippon Unicar Company Limited, Evaflex-EEA series (EEA) available from DuPont-Mitsui Polychemicals Co., Ltd., EEA available from Nippon Unicar Company Limited, DAI-EL Latex series (fluorine rubber) available from Daikin Industries, Ltd., TRD-2001 (SBR) available from JSR, and BM-400B (SBR) available from Zeon Corporation, Japan.

In the case of using the organic binder in the porous layer (II), it can be used in an emulsion form in which it is dissolved or dispersed in a solvent for a porous layer (II) forming composition, which will be described later.

The applied/laminated type separator can be produced by, for example, applying a porous layer (II) forming composition (for example, a liquid composition such as a slurry) containing particles of the resin that does not melt at a temperature of 150° C. or less, the inorganic filler having a heat resistance temperature of 150° C. or more or the like on the surface of a microporous film for forming a porous layer (I) and drying it at a predetermined temperature to form a porous layer (II).

The porous layer (II) forming composition contains particles of a resin that does not melt at a temperature of 150° C. or less and/or an inorganic filler having a heat resistance temperature of 150° C. or more, and optionally an organic binder and the like, and can be obtained by dispersing these in a solvent (including a dispersing medium, the same applies hereinafter). The organic binder may be dissolved in the solvent. The solvent used in the porous layer (II) forming composition can be any solvent as long as particles of the resin that does not melt at a temperature of 150° C. or less, the inorganic filler or the like can be uniformly dispersed, and the organic binder can be uniformly dissolved or dispersed, and commonly used organic solvents are preferably used such as aromatic hydrocarbons such as toluene, furans such as tetrahydrofuran, and ketones such as methyl ethyl ketone and methyl isobutyl ketone. For the purpose of controlling the interfacial tension, an alcohol (ethylene glycol, propylene glycol or the like), a propylene oxide-based glycol ether such as monomethyl acetate or the like may be added to these solvents as appropriate. In the case where the organic binder is water-soluble or is used as an emulsion, the solvent may be water. In this case as well, an alcohol (methyl alcohol, ethyl alcohol, isopropyl alcohol, ethylene glycol or the like) may be added as appropriate so as to control the interfacial tension.

In the porous layer (II) forming composition, the solid content including particles of the resin that does not melt at a temperature of 150° C. or less and/or the inorganic filler having a heat resistance temperature of 150° C. or more, the organic binder and the like is preferably, for example, 10 mass % or more and 80 mass % or less.

In the laminated type separator, the porous layer (I) and the porous layer (II) are not necessarily separate layers, and a plurality of layers may be included in the separator. For example, it is possible to employ a configuration in which the porous layer (I) is placed on both sides of the porous layer (II) or a configuration in which the porous layer (II) is placed on both sides of the porous layer (I). However, increasing the number of layers to increase the separator thickness may cause an increase in the internal resistance of the battery and a reduction in the energy density, and thus a too large number of layers is not preferable. The total number of the porous layers (I) and the porous layers (II) in the laminated type separator is preferably 5 or less.

The separator (a separator made of a polyolefin microporous film, or the above-described laminated type separator) included in the battery of the present invention preferably has a thickness of, for example, 10 μm or more and 30 μm or less.

In the laminated type separator, the porous layer (II) preferably has a thickness (the total thickness if the separator has a plurality of porous layers (II)) of 3 μm or more from the viewpoint of effectively exhibiting the above-described actions of the porous layer (II). However, if the porous layer (II) is too thick, there is a possibility that the energy density of the battery might be reduced, and thus the thickness of the porous layer (II) is preferably 8 μm or less.

Furthermore, in the laminated type separator, the porous layer (I) preferably has a thickness (the total thickness if the separator has a plurality of porous layers (I), the same applies hereinafter) of 6 μm or more, and more preferably 10 μm or more from the viewpoint of effectively exhibiting the above-described actions (the shutdown action in particular) obtained by using the porous layer (I). However, if the porous layer (I) is too thick, there is a possibility that the energy density of the battery might be reduced, and that the action that suppresses the overall thermal shrinkage of the separator might be small due to increasing force of the porous layer (I) trying to thermally shrink. Accordingly, the porous layer (I) preferably has a thickness of 25 μm or less, more preferably 20 μm or less, and even more preferably 14 μm or less.

The overall porosity of the separator is preferably 30% or more in the dry state in order to secure the amount of non-aqueous electrolyte retained and to obtain better ion permeability. On the other hand, from the viewpoint of ensuring the separator strength and preventing internal short-circuiting, the porosity of the separator is preferably 70% or less in the dry state. The porosity P(%) of the separator can be calculated by determining the total sum of individual components i using the following Equation (2) from the thickness of the separator, the mass per area, and the density of constituent component.

$$P=\{1-(m/t)/(\Sigma a_i \rho_i)\} \times 100 \qquad (2)$$

where $a_i$ is the proportion of component i when the total mass is taken as 1, $\rho_i$ is the density (g/cm³) of component i, m is the mass per unit area (g/cm²) of the separator, and t is the thickness (cm) of the separator.

In the case of the laminated type separator, the porosity P(%) of the porous layer (I) can be determined using Equation (2) above by taking m as the mass per unit area (g/cm²) of the porous layer (I), and t as the thickness (cm) of the porous layer (I) in Equation (2). The porosity of the porous layer (I) determined by this method is preferably 30% or more and 70% or less.

Furthermore, in the case of the laminated type separator, the porosity P(%) of the porous layer (II) can be determined as well using Equation (2) above by taking m as the mass per unit area (g/cm²) of the porous layer (II), and t as the thickness (cm) of the porous layer (II) in Equation (2). The porosity of the porous layer (II) determined by this method is preferably 20% or more and 60% or less.

The separator preferably has a high mechanical strength, and preferably has, for example, a piercing strength of 3 N or more. In the case where, for example, SiO, whose volume changes significantly due to charge and discharge is used as a negative electrode active material, mechanical damage is applied to the separator facing the negative electrode as well due to expansion and contraction of the entire negative electrode as a result of repetition of charge and discharge. If the separator has a piercing strength of 3 N or more, a good mechanical strength can be ensured, and the mechanical damage to the separator can be mitigated.

An example of the separator having a piercing strength of 3 N or more can be the above-described laminated type separator, and in particular, a separator in which a porous layer (II) composed mainly of an inorganic filler having a heat resistance temperature of 150° C. or more is laminated on a porous layer (I) composed mainly of a resin having a melting point of 140° C. or less is preferable. This is presumably because since the mechanical strength of the inorganic filler is high, the mechanical strength of the porous layer (I) is reinforced, as a result of which the overall mechanical strength of the separator can be increased.

The piercing strength can be measured by the following method. The separator is fixed onto a plate having a 2 inch diameter hole without creating wrinkles and sags, and a hemispherical metallic pin with a tip diameter of 1.0 mm is penetrated through the measurement sample at a speed of 120 mm/min, and the force required to form a hole in the separator is measured five times. Then, three measured values out of the five measured values excluding the highest and lowest values are averaged and defined as the piercing strength of the separator.

The above-described positive electrode, the above-described negative electrode and the above-described separator can be used in the form of a laminate electrode assembly in which the positive electrode and the negative electrode are laminated with the separator interposed therebetween or a wound electrode assembly obtained by spirally winding the laminate electrode assembly, in the battery of the present invention.

In the case where the laminated type separator, particularly the separator in which a porous layer (II) composed mainly of an inorganic filler having a heat resistance temperature of 150° C. or more is laminated on a porous layer (I) composed mainly of a resin having a melting point of 140° C. or less is used in the laminate electrode assembly or the wound electrode assembly, it is preferable that the porous layer (II) is placed so as to face at least the positive electrode. In this case, the porous layer (II) composed mainly of the inorganic filler having a heat resistance temperature of 150° C. or more having excellent oxidation resistance faces the positive electrode, whereby oxidation of the separator due to the positive electrode can be better suppressed, and the high temperature storage characteristics and the charge/discharge cycle characteristics of the battery can be enhanced as well. In the case where an additive such as VC or cyclohexylbenzene is added to the non-aqueous electrolyte, there is a possibility that a coating might be formed on the positive electrode side to clog the pores of the separator, causing degradation of the battery characteristics, but by causing the porous layer (II) that is relatively porous to face the positive electrode, the effect of suppressing the clogging of the pores can be expected.

On the other hand, in the case where the porous layer (I) is on one surface of the laminated type separator, it is preferable that the porous layer (I) faces the negative electrode, whereby, it is possible to, for example, prevent the thermoplastic resin melted from the porous layer (I) as a result of a shutdown from being absorbed into the electrode material mixture layer, and thereby the thermoplastic resin can be efficiently utilized to suppress the clogging of the pores of the separator.

As the configuration of the lithium secondary battery of the present invention, the battery can be a cylindrical (rectangular cylinder, circular cylinder or the like) battery using a steel can, an aluminum can or the like as the outer case can. The battery may be a soft package battery using a laminated film having a metal deposited thereon as an outer case.

The lithium secondary battery of the present invention can be used in the same applications as conventionally known lithium secondary batteries.

Hereinafter, the present invention will be described in detail by way of examples. It should be noted, however, that the examples given below are not intended to limit the scope of the present invention.

EXAMPLE 1

Synthesis of Positive Electrode Active Material

A coprecipitated compound (spherical coprecipitated compound) containing Ni, Co and Mn was synthesized by placing, in a reaction vessel, ammonia water having a pH adjusted to approximately 12 by addition of sodium hydroxide, and then, while strongly stirring, adding dropwise a mixed aqueous solution containing nickel sulfate, cobalt sulfate and manganese sulfate at a concentration of 2.4 mol/dm$^3$, 0.8 mol/dm$^3$ and 0.8 mol/dm$^3$, respectively, and ammonia water having a concentration of 25 mass % at a rate of 23 cm$^3$/min and 6.6 cm$^3$/min, respectively, using a metering pump. At this time, the temperature of the reaction solution was held at 50° C., an aqueous solution of sodium hydroxide having a concentration of 6.4 mol/dm$^3$ was also added dropwise such that the pH of the reaction solution was maintained at around 12, and a nitrogen gas was bubbled at a flow rate of 1 dm$^3$/min.

The synthesized coprecipitated compound was washed with water, filtrated and dried to obtain a hydroxide containing Ni, Co and Mn at a molar ratio of 6:2:2. The obtained hydroxide in an amount of 0.196 mol and 0.204 mol of LiOH.H$_2$O were dispersed in ethanol to form a slurry, and the slurry was mixed for 40 minutes using a planetary ball mill and dried at room temperature to obtain a mixture. Subsequently, the mixture was placed in an alumina crucible, heated to 600° C. in a dry air flow of 2 dm$^3$/min, held at that temperature for two hours for preheating, and baked for 12 hours by increasing the temperature to 900° C. A lithium-containing composite oxide was thereby synthesized.

The obtained lithium-containing composite oxide was washed with water, heat treated in the atmospheric air (with an oxygen concentration of approximately 20 vol %) at 850° C. for 12 hours, and then pulverized into powder using a mortar. The pulverized lithium-containing composite oxide was stored in a desiccator.

The lithium-containing composite oxide was analyzed for its composition by an atomic absorption spectrometer, and was found to have a composition represented by $Li_{1.02}Ni_{0.6}Co_{0.2}Mn_{0.2}O_2$.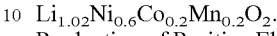

Production of Positive Electrode

A positive electrode material mixture-containing paste was prepared by kneading 100 parts by mass of the lithium-containing composite oxide, 20 parts by mass of an NMP solution containing PVDF as a binder at a concentration of 10 mass %, 1.04 parts by mass of carbon fibers having an average fiber length of 100 nm and an average fiber diameter of 10 nm, and 1.04 parts by mass of graphite with the use of a biaxial kneader and then adding NMP for viscosity adjustment.

The positive electrode material mixture-containing paste was applied to both sides of a 15 μm thick aluminum foil (positive electrode current collector), and then vacuum-dried at 120° C. for 12 hours to form positive electrode material mixture layers on both sides of the aluminum foil. After that, pressing was performed to adjust the thickness and density of the positive electrode material mixture layers, a lead connector made of nickel was welded to an exposed portion of the aluminum foil, and a strip-shaped positive electrode having a length of 375 mm and a width of 43 mm was produced. The positive electrode material mixture layer of the obtained positive electrode had a thickness of 55 μm per side. The carbon fiber content in the positive electrode material mixture layer of the positive electrode was 1.0 mass %.

Production of Negative Electrode

A negative electrode material mixture-containing paste was prepared by adding water to 97.5 parts by mass of natural graphite having a number average particle size of 10 μm as a negative electrode active material, 1.5 parts by mass of SBR as a binder and 1 part by mass of CMC as a thickener and mixing them. The prepared negative electrode material mixture-containing paste was applied to both sides of a 8 μm thick copper foil, and then vacuum-dried at 120° C. for 12 hours to form negative electrode material mixture layers on both sides of the copper foil. After that, pressing was performed to adjust the thickness and density of the negative electrode material mixture layers, a lead connector made of nickel was welded to an exposed portion of the copper foil, and a strip-shaped negative electrode having a length of 380 mm and a width of 44 mm was produced. The negative electrode material mixture layer of the obtained negative electrode had a thickness of 65 μm per side.

Assembly of Battery

The positive electrode and the negative electrode obtained in the manner described above were laminated with a 16 μm thick microporous polyethylene separator (porosity: 41%) interposed therebetween, and spirally wound to produce a wound electrode assembly. The obtained wound electrode assembly was pressed into a flat shape and housed in an aluminum outer case can having a thickness of 5 mm, a width of 42 mm and a height of 61 mm, and a non-aqueous electrolyte (a solution obtained by dissolving LiPF$_6$ at a concentration of 1.2 mol/L in a solvent mixture of ethylene carbonate and ethyl methyl carbonate mixed at a volume ratio of 1:2) was injected.

Figure 1B:
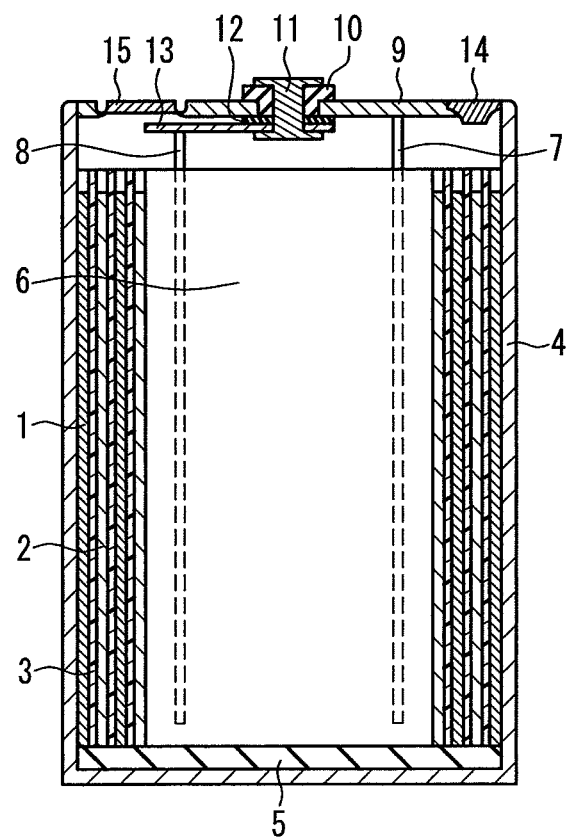
FIG. 1B is a cross-sectional view of FIG. 1A.
Figure 2:
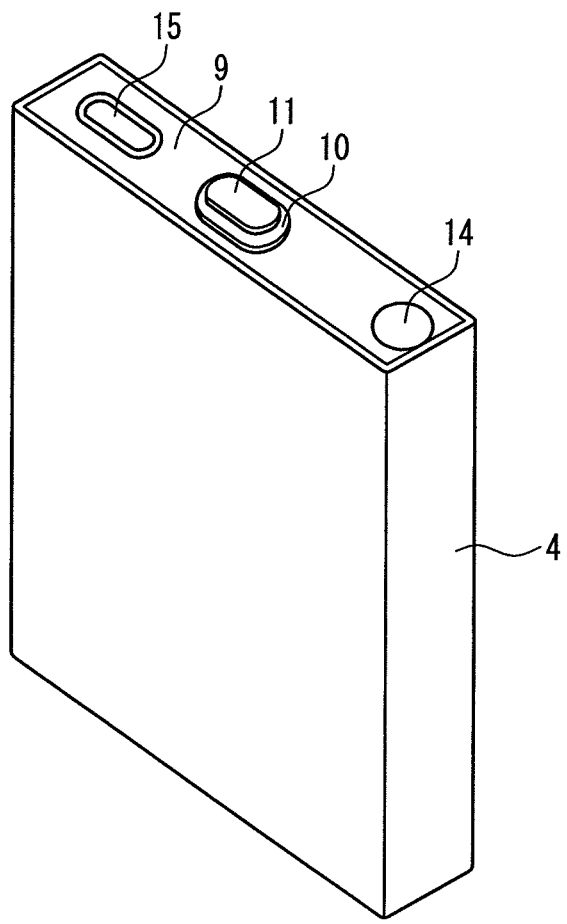
FIG. 2 is a perspective view of FIG. 1A.

After injection of the non-aqueous electrolyte, the outer case can was sealed to produce a lithium secondary battery having the structure shown in FIGS. 1A and 1B and the outer appearance shown in FIG. 2. This battery was provided, at the top of the can, with a rupture vent for decreasing the pressure in the event that the internal pressure increases.

The battery shown in FIGS. 1A, 1B and 2 will be described. FIG. 1A is a plan view and FIG. 1B is a cross-sectional view of FIG. 1A. As shown in FIG. 1B, a positive electrode 1 and a negative electrode 2 are spirally wound via a separator 3 interposed therebetween, and then pressed into a flat shape to form a flat wound electrode assembly 6, and the electrode assembly 6 is housed in a rectangular cylindrical outer case can 4 together with an electrolyte. In order to simplify the illustration of FIG. 1B, metal foils serving as current collectors used to produce the positive electrode 1 and the negative electrode 2 and the electrolyte are not illustrated.

The outer case can 4 is a battery outer case made of an aluminum alloy, and the outer case can 4 also serves as a positive electrode terminal. An insulator 5 made of a PE sheet is placed on the bottom of the outer case can 4, and a positive electrode lead connector 7 and a negative electrode lead connector 8 connected to the ends of the positive electrode 1 and the negative electrode 2, respectively, are drawn from the flat wound electrode assembly 6 including the positive electrode 1, the negative electrode 2 and the separator 3. A stainless steel terminal 11 is attached to a sealing lid plate 9 made of an aluminum alloy for sealing the opening of the outer case can 4 with a PP insulation packing 10 interposed therebetween, and a stainless steel lead plate 13 is attached to the terminal 11 with an insulator 12 interposed therebetween.

Then, the lid plate 9 is inserted into the opening of the outer case can 4, the joint portions of the lid plate 9 and the outer case can 4 are welded to seal the opening of the outer case can 4, and thereby the interior of the battery is sealed. In the battery shown in FIGS. 1A and 1B, the lid plate 9 is provided with a non-aqueous electrolyte inlet 14, and the non-aqueous electrolyte inlet 14 is sealed by welding such as laser welding, with a sealing member inserted into the non-aqueous electrolyte inlet 14, and thereby the seal of the battery is ensured. Accordingly, in the battery shown in FIGS. 1A, 1B and 2, the non-aqueous electrolyte inlet 14 actually includes the non-aqueous electrolyte inlet and the sealing member, but in order to simplify the illustration, they are indicated as the non-aqueous electrolyte inlet 14. The lid plate 9 is also provided with a rupture vent 15 serving as a mechanism that discharges internal gas to the outside in the event of overheating of the battery.

In the battery of Example 1, the positive electrode lead connector 7 is welded directly to the lid plate 9, whereby the outer case can 4 and the lid plate 9 function as a positive electrode terminal. Likewise, the negative electrode lead connector 8 is welded to the lead plate 13, and the negative electrode lead connector 8 and the terminal 11 are electrically connected via the lead plate 13, whereby the terminal 11 functions as a negative electrode terminal. However, the polarity may be reversed depending on the material of the outer case can 4.

FIG. 2 is a perspective view schematically showing the outer appearance of the battery shown in FIGS. 1A and 1B, and FIG. 2 is illustrated to indicate that the battery is a prismatic battery. FIG. 2 schematically shows the battery, and thus only specific constituent elements of the battery are shown. Similarly, in FIG. 1B, the innermost portion of the electrode assembly is not shown in cross section.

EXAMPLE 2

A positive electrode material mixture-containing paste was prepared in the same manner as in Example 1, except that the amount of carbon fibers having an average fiber length of 100 nm and an average fiber diameter of 10 nm was changed to 0.26 parts by mass and that the amount of graphite was changed to 1.82 parts by mass. Then, a positive electrode was produced in the same manner as in Example 1, except that the positive electrode material mixture-containing paste was used. Thereafter, a lithium secondary battery was produced in the same manner as in Example 1, except that the positive electrode was used. The carbon fiber content in the positive electrode material mixture layer of the positive electrode was 0.25 mass %.

EXAMPLE 3

A positive electrode material mixture-containing paste was prepared in the same manner as in Example 1, except that the amount of carbon fibers having an average fiber length of 100 nm and an average fiber diameter of 10 nm was changed to 0.62 parts by mass and that the amount of graphite was changed to 1.46 parts by mass. Then, a positive electrode was produced in the same manner as in Example 1, except that the positive electrode material mixture-containing paste was used. Thereafter, a lithium secondary battery was produced in the same manner as in Example 1, except that the positive electrode was used. The carbon fiber content in the positive electrode material mixture layer of the positive electrode was 0.6 mass %.

EXAMPLE 4

A positive electrode material mixture-containing paste was prepared in the same manner as in Example 1, except that the amount of carbon fibers having an average fiber length of 100 nm and an average fiber diameter of 10 nm was changed to 1.56 parts by mass and that the amount of graphite was changed to 0.52 parts by mass. Then, a positive electrode was produced in the same manner as in Example 1, except that the positive electrode material mixture-containing paste was used. Thereafter, a lithium secondary battery was produced in the same manner as in Example 1, except that the positive electrode was used. The carbon fiber content in the positive electrode material mixture layer of the positive electrode was 1.5 mass %.

EXAMPLE 5

A lithium-containing composite oxide having the composition shown in Table 1 was synthesized in the same manner as in Example 1, except that a hydroxide containing Ni, Co and Mn at a molar ratio of 6:3:1 was synthesized by adjusting the concentrations of the raw material compounds of the mixed aqueous solution used to synthesize the coprecipitated compound, and the synthesized hydroxide was used, and a positive electrode was produced in the same manner as in Example 1, except that the lithium-containing composite oxide was used. Then, a lithium secondary battery was produced in the same manner as in Example 1, except that the positive electrode was used. The carbon fiber content in the positive electrode material mixture layer of the positive electrode was 1.0 mass %.

EXAMPLE 6

A lithium-containing composite oxide having the composition shown in Table 1 was synthesized in the same manner as in Example 1, except that a hydroxide containing Ni, Co and Mn at a molar ratio of 6:1:3 was synthesized by adjusting the concentrations of the raw material compounds of the mixed aqueous solution used to synthesize the coprecipitated compound, and the synthesized hydroxide was used, and a positive electrode was produced in the same manner as in Example 1, except that the lithium-containing composite oxide was used. Then, a lithium secondary battery was produced in the same manner as in Example 1, except that the positive electrode was used. The carbon fiber content in the positive electrode material mixture layer of the positive electrode was 1.0 mass %.

EXAMPLE 7

A lithium-containing composite oxide having the composition shown in Table 1 was synthesized in the same manner as in Example 1, except that a hydroxide containing Ni, Co and Mn at a molar ratio of 5.5:1.5:3 was synthesized by adjusting the concentrations of the raw material compounds of the mixed aqueous solution used to synthesize the coprecipitated compound, and the synthesized hydroxide was used, and a positive electrode was produced in the same manner as in Example 1, except that the lithium-containing composite oxide was used. Then, a lithium secondary battery was produced in the same manner as in Example 1, except that the positive electrode was used. The carbon fiber content in the positive electrode material mixture layer of the positive electrode was 1.0 mass %.

EXAMPLE 8

A lithium-containing composite oxide having the composition shown in Table 1 was synthesized in the same manner as in Example 1, except that a hydroxide containing Ni, Co and Mn at a molar ratio of 5.5:2:2.5 was synthesized by adjusting the concentrations of the raw material compounds of the mixed aqueous solution used to synthesize the coprecipitated compound, and the synthesized hydroxide was used, and a positive electrode was produced in the same manner as in Example 1, except that the lithium-containing composite oxide was used. Then, a lithium secondary battery was produced in the same manner as in Example 1, except that the positive electrode was used. The carbon fiber content in the positive electrode material mixture layer of the positive electrode was 1.0 mass %.

EXAMPLE 9

A lithium-containing composite oxide having the composition shown in Table 1 was synthesized in the same manner as in Example 1, except that a hydroxide containing Ni, Co and Mn at a molar ratio of 5:2:3 was synthesized by adjusting the concentrations of the raw material compounds of the mixed aqueous solution used to synthesize the coprecipitated compound, and the synthesized hydroxide was used, and a positive electrode was produced in the same manner as in Example 1, except that the lithium-containing composite oxide was used. Then, a lithium secondary battery was produced in the same manner as in Example 1, except that the positive electrode was used. The carbon fiber content in the positive electrode material mixture layer of the positive electrode was 1.0 mass %.

EXAMPLE 10

A lithium-containing composite oxide having the composition shown in Table 1 was synthesized in the same manner as in Example 1, except that a hydroxide containing Ni, Co and Mn at a molar ratio of 5:3:2 was synthesized by adjusting the concentrations of the raw material compounds of the mixed aqueous solution used to synthesize the coprecipitated compound, and the synthesized hydroxide was used, and a positive electrode was produced in the same manner as in Example 1, except that the lithium-containing composite oxide was used. Then, a lithium secondary battery was produced in the same manner as in Example 1, except that the positive electrode was used. The carbon fiber content in the positive electrode material mixture layer of the positive electrode was 1.0 mass %.

EXAMPLE 11

A coprecipitated compound was synthesized in the same manner as in Example 1, except that a mixed aqueous solution containing nickel sulfate, cobalt sulfate, manganese sulfate and magnesium sulfate at a concentration of 2.69 mol/dm$^3$, 0.84 mol/dm$^3$, 0.63 mol/dm$^3$, and 0.04 mol/dm$^3$, respectively, was used. Then, a hydroxide containing Ni, Co, Mn and Mg at a molar ratio of 64:20:15:1 was synthesized in the same manner as in Example 1, except that the coprecipitated compound was used, and a lithium-containing composite oxide having the composition shown in Table 2 was synthesized in the same manner as in Example 1, except that 0.2 mol of the hydroxide and 0.2 mol of LiOH.H$_2$O were used. Then, a positive electrode was produced in the same manner as in Example 1, except that the lithium-containing composite oxide was used. Thereafter, a lithium secondary battery was produced in the same manner as in Example 1, except that the positive electrode was used. The carbon fiber content in the positive electrode material mixture layer of the positive electrode was 1.0 mass %.

EXAMPLE 12

A lithium-containing composite oxide having the composition shown in Table 2 was synthesized in the same manner as in Example 1, except that 0.2 mol of a hydroxide containing Ni, Co, Mn and Mg at a molar ratio of 63.8:20:15:1 synthesized in the same manner as in Example 11, 0.2 mol of LiOH.H$_2$O and 0.0004 mol of GeO$_2$ were used. Then, a positive electrode was produced in the same manner as in Example 1, except that the lithium-containing composite oxide was used, and a lithium secondary battery was produced in the same manner as in Example 1, except that the positive electrode was used. The carbon fiber content in the positive electrode material mixture layer of the positive electrode was 1.0 mass %.

EXAMPLE 13

A lithium-containing composite oxide having the composition shown in Table 2 was synthesized in the same manner as in Example 1, except that 0.2 mol of a hydroxide containing Ni, Co, Mn and Mg at a molar ratio of 63.8:20:15:1 synthesized in the same manner as in Example 11, 0.2 mol of LiOH.H$_2$O and 0.0002 mol of B$_2$O$_3$ were used. Then, a positive electrode was produced in the same manner as in Example 1, except that the lithium-containing composite oxide was used, and a lithium secondary battery was produced in the same manner as in Example 1, except that the positive electrode was used. The carbon fiber content in the positive electrode material mixture layer of the positive electrode was 1.0 mass %.

EXAMPLE 14

A lithium-containing composite oxide having the composition shown in Table 2 was synthesized in the same manner as in Example 1, except that 0.2 mol of a hydroxide containing Ni, Co, Mn and Mg at a molar ratio of 63.8:20:15:1 synthesized in the same manner as in Example 11, 0.2 mol of $LiOH \cdot H_2O$ and 0.0002 mol of $Ga_2O_3$ were used. Then, a positive electrode was produced in the same manner as in Example 1, except that the lithium-containing composite oxide was used, and a lithium secondary battery was produced in the same manner as in Example 1, except that the positive electrode was used. The carbon fiber content in the positive electrode material mixture layer of the positive electrode was 1.0 mass %.

EXAMPLE 15

A lithium-containing composite oxide having the composition shown in Table 2 was synthesized in the same manner as in Example 1, except that 0.2 mol of a hydroxide containing Ni, Co, Mn and Mg at a molar ratio of 63.8:20:15:1 synthesized in the same manner as in Example 11, 0.2 mol of $LiOH \cdot H_2O$ and 0.0004 mol of $SrCO_3$ were used. Then, a positive electrode was produced in the same manner as in Example 1, except that the lithium-containing composite oxide was used, and a lithium secondary battery was produced in the same manner as in Example 1, except that the positive electrode was used. The carbon fiber content in the positive electrode material mixture layer of the positive electrode was 1.0 mass %.

EXAMPLE 16

A lithium-containing composite oxide having the composition shown in Table 2 was synthesized in the same manner as in Example 1, except that 0.2 mol of a hydroxide containing Ni, Co, Mn and Mg at a molar ratio of 63.8:20:15:1 synthesized in the same manner as in Example 11, 0.2 mol of $LiOH \cdot H_2O$ and 0.0004 mol of $Ba(OH)_2$ were used. Then, a positive electrode was produced in the same manner as in Example 1, except that the lithium-containing composite oxide was used, and a lithium secondary battery was produced in the same manner as in Example 1, except that the positive electrode was used. The carbon fiber content in the positive electrode material mixture layer of the positive electrode was 1.0 mass %.

COMPARATIVE EXAMPLE 1

A positive electrode material mixture-containing paste was prepared in the same manner as in Example 1, except that the amount of carbon fibers having an average fiber length of 100 nm and an average fiber diameter of 10 nm was changed to 0.16 parts by mass and that the amount of graphite was changed to 1.92 parts by mass. Then, a positive electrode was produced in the same manner as in Example 1, except that the positive electrode material mixture-containing paste was used. Thereafter, a lithium secondary battery was produced in the same manner as in Example 1, except that the positive electrode was used. The carbon fiber content in the positive electrode material mixture layer of the positive electrode was 0.15 mass %.

COMPARATIVE EXAMPLE 2

A positive electrode material mixture-containing paste was prepared in the same manner as in Example 1, except that the amount of carbon fibers having an average fiber length of 100 nm and an average fiber diameter of 10 nm was changed to 2.08 parts by mass and that the amount of graphite was changed to 0 parts by mass. Then, a positive electrode was produced in the same manner as in Example 1, except that the positive electrode material mixture-containing paste was used. Thereafter, a lithium secondary battery was produced in the same manner as in Example 1, except that the positive electrode was used. The carbon fiber content in the positive electrode material mixture layer of the positive electrode was 2.0 mass %.

The composition of the positive electrode active material (lithium-containing composite oxide) used in the lithium secondary batteries of Examples 1 to 16 and Comparative Examples 1 and 2, and the content of carbon fibers having an average fiber length of 100 nm and an average fiber diameter of 10 nm in the positive electrode material mixture layer (shown as "carbon fiber content in positive electrode material mixture layer" in the tables) are shown in Tables 1 and 2.

TABLE 1

| | Composition of Lithium-Containing Composite Oxide | | | | Carbon Fiber Content in Positive Electrode Material |
|---|---|---|---|---|---|
| | Compositional Formula | x | a | b | c | Mixture Layer (mass %) |
| Ex. 1 | $Li_{1.02}Ni_{0.6}Co_{0.2}Mn_{0.2}O_2$ | 0.02 | 60 | 20 | 20 | 1.0 |
| Ex. 2 | $Li_{1.02}Ni_{0.6}Co_{0.2}Mn_{0.2}O_2$ | 0.02 | 60 | 20 | 20 | 0.25 |
| Ex. 3 | $Li_{1.02}Ni_{0.6}Co_{0.2}Mn_{0.2}O_2$ | 0.02 | 60 | 20 | 20 | 0.6 |
| Ex. 4 | $Li_{1.02}Ni_{0.6}Co_{0.2}Mn_{0.2}O_2$ | 0.02 | 60 | 20 | 20 | 1.5 |
| Ex. 5 | $Li_{1.02}Ni_{0.6}Co_{0.3}Mn_{0.1}O_2$ | 0.02 | 60 | 30 | 10 | 1.0 |
| Ex. 6 | $Li_{1.02}Ni_{0.6}Co_{0.1}Mn_{0.3}O_2$ | 0.02 | 60 | 10 | 30 | 1.0 |
| Ex. 7 | $Li_{1.02}Ni_{0.55}Co_{0.15}Mn_{0.3}O_2$ | 0.02 | 55 | 15 | 30 | 1.0 |
| Ex. 8 | $Li_{1.02}Ni_{0.55}Co_{0.2}Mn_{0.25}O_2$ | 0.02 | 55 | 20 | 25 | 1.0 |
| Ex. 9 | $Li_{1.02}Ni_{0.5}Co_{0.2}Mn_{0.3}O_2$ | 0.02 | 50 | 20 | 30 | 1.0 |
| Ex. 10 | $Li_{1.02}Ni_{0.5}Co_{0.3}Mn_{0.2}O_2$ | 0.02 | 50 | 30 | 20 | 1.0 |

TABLE 2

| | Composition of Lithium-Containing Composite Oxide | | | | Carbon Fiber Content in Positive Electrode Material |
|---|---|---|---|---|---|
| | Compositional Formula | x | a | b | c | Mixture Layer (mass %) |
| Ex. 11 | $LiNi_{0.64}Co_{0.2}Mn_{0.15}Mg_{0.01}O_2$ | 0 | 64 | 20 | 15 | 1.0 |
| Ex. 12 | $LiNi_{0.638}Co_{0.2}Mn_{0.15}Mg_{0.01}Ge_{0.002}O_2$ | 0 | 63.8 | 20 | 15 | 1.0 |

TABLE 2-continued

| | Composition of Lithium-Containing Composite Oxide | | | | Carbon Fiber Content in Positive Electrode Material |
|---|---|---|---|---|---|
| | Compositional Formula | x | a | b | c | Mixture Layer (mass %) |
| Ex. 13 | $LiNi_{0.638}Co_{0.2}Mn_{0.15}Mg_{0.01}B_{0.002}O_2$ | 0 | 63.8 | 20 | 15 | 1.0 |
| Ex. 14 | $LiNi_{0.638}Co_{0.2}Mn_{0.15}Mg_{0.01}Ga_{0.002}O_2$ | 0 | 63.8 | 20 | 15 | 1.0 |
| Ex. 15 | $LiNi_{0.638}Co_{0.2}Mn_{0.15}Mg_{0.01}Sr_{0.002}O_2$ | 0 | 63.8 | 20 | 15 | 1.0 |
| Ex. 16 | $LiNi_{0.638}Co_{0.2}Mn_{0.15}Mg_{0.01}Ba_{0.002}O_2$ | 0 | 63.8 | 20 | 15 | 1.0 |
| Comp. Ex. 1 | $Li_{1.02}Ni_{0.6}Co_{0.2}Mn_{0.2}O_2$ | 0.02 | 60 | 20 | 20 | 0.15 |
| Comp. Ex. 2 | $Li_{1.02}Ni_{0.6}Co_{0.2}Mn_{0.2}O_2$ | 0.02 | 60 | 20 | 20 | 2.0 |

The lithium secondary batteries of Examples 1 to 16 and Comparative Examples 1 and 2 were subjected to the following tests conducted at room temperature (25° C.).

Load Characteristics Test

Each battery was charged at a constant current of 1 C (corresponding to 1200 mA) and a constant voltage of 4.2 V (charge time was restricted to 3 hours) and then discharged at a constant current of 0.2 C until the battery voltage reached 2.7 V, and thereby the discharge capacity at 0.2 C was obtained. Next, each battery was charged under the same conditions as described above and then discharged at a constant current of 2 C until the battery voltage reached 2.7 V, and thereby the discharge capacity at 2 C was obtained. The ratio (2 C/0.2 C discharge capacity ratio) of discharge capacity at 2 C to discharge capacity at 0.2 C was determined in percentage (%), and evaluated as the load characteristics of the battery. The results are shown in Table 3.

Charge/Discharge Cycle Characteristics Test

Each battery was subjected to constant current-constant voltage charge (total charge time: 3 hours) using a constant current of 1 C and a constant voltage of 4.2 V and then to a constant current discharge at 1 C (end-of-discharge voltage: 2.7 V), and the discharge capacity (mAh) was measured. This was defined as one cycle, and this charge/discharge cycle was repeated 500 times under the above-described conditions, and capacity retention ratio (=discharge capacity at 500th cycle/discharge capacity at 1st cycle×100%) was calculated. The results are also shown in Table 3.

TABLE 3

| | 2 C/0.2 C | Charge/Discharge Cycle Characteristics Test | |
|---|---|---|---|
| | Discharge Capacity Ratio (%) | Discharge Capacity at 1st Cycle (mAh) | Capacity Retention Ratio (%) |
| Ex. 1 | 94.2 | 1180 | 82.6 |
| Ex. 2 | 90.5 | 1120 | 80.0 |
| Ex. 3 | 91.8 | 1170 | 81.0 |
| Ex. 4 | 94.1 | 1120 | 83.4 |
| Ex. 5 | 94.0 | 1180 | 81.7 |
| Ex. 6 | 94.3 | 1180 | 81.5 |
| Ex. 7 | 94.2 | 1180 | 83.1 |
| Ex. 8 | 94.1 | 1180 | 81.2 |
| Ex. 9 | 93.9 | 1180 | 81.5 |
| Ex. 10 | 93.8 | 1180 | 81.2 |
| Ex. 11 | 94.1 | 1180 | 84.4 |
| Ex. 12 | 94.2 | 1180 | 81.3 |
| Ex. 13 | 94.3 | 1180 | 81.5 |
| Ex. 14 | 94.1 | 1180 | 81.1 |
| Ex. 15 | 94.2 | 1180 | 80.5 |
| Ex. 16 | 94.1 | 1180 | 82.1 |
| Comp. Ex. 1 | 75.2 | 1080 | 50.0 |
| Comp. Ex. 2 | 89.6 | 1090 | 75.4 |

As is clear from Table 3, the lithium secondary batteries of Examples 1 to 16, which included the positive electrode containing an appropriate amount of carbon fibers having a suitable configuration in the positive electrode material mixture layer, exhibited excellent load characteristics with a high 2 C/0.2 C discharge capacity ratio, and also had a large discharge capacity at the first cycle in the charge/discharge cycle characteristics test, a high capacity, a high capacity retention ratio after the 500th cycle, and good charge/discharge cycle characteristics.

In contrast, the batteries of Comparative Examples 1 and 2, which included the positive electrode having a large or small amount of carbon fibers in the positive electrode material mixture layer, exhibited poorer performance than the batteries of Examples 1 to 16 in terms of both load characteristics and charge/discharge cycle characteristics.

EXAMPLE 17

A negative electrode material mixture-containing paste was prepared by adding water to 97.5 parts by mass of a mixture in which a composite of carbon with SiO having an average particle size $D_{50\%}$ of 5 μm (a composite in which the surface of SiO was covered with carbon, the amount of carbon in the composite being 20 mass %) as a negative electrode active material and graphitic carbon having an average particle size $D_{50\%}$ of 16 μm were mixed at a mass ratio of 5:95 (SiO-carbon composite: graphitic carbon), 1.5 mass % of SBR as a binder and 1 mass % of CMC as a thickener, and mixing them. The negative electrode material mixture-containing paste was applied to both sides of an 8 μm thick copper foil, and then vacuum-dried at 120° C. for 12 hours to form negative electrode material mixture layers on both sides of the copper foil. After that, pressing was performed to adjust the thickness and density of the negative electrode material mixture layers, a lead connector made of nickel was welded to an exposed portion of the copper foil, and a strip-shaped negative electrode having a length of 380 mm and a width of 44 mm was produced. The negative electrode material mixture layer of the obtained negative electrode had a thickness of 55 μm per side.

Then, a lithium secondary battery was produced in the same manner as in Example 1, except that the negative electrode was used.

EXAMPLE 18

A lithium secondary battery was produced in the same manner as in Example 2, except that the same negative electrode as that used in Example 17 was used.

EXAMPLE 19

A lithium secondary battery was produced in the same manner as in Example 4, except that the same negative electrode as that used in Example 17 was used.

EXAMPLE 20

A lithium secondary battery was produced in the same manner as in Example 5, except that the same negative electrode as that used in Example 17 was used.

EXAMPLE 21

A lithium secondary battery was produced in the same manner as in Example 6, except that the same negative electrode as that used in Example 17 was used.

EXAMPLE 22

A lithium secondary battery was produced in the same manner as in Example 7, except that the same negative electrode as that used in Example 17 was used.

EXAMPLE 23

A lithium secondary battery was produced in the same manner as in Example 8, except that the same negative electrode as that used in Example 17 was used.

EXAMPLE 24

A lithium secondary battery was produced in the same manner as in Example 9, except that the same negative electrode as that used in Example 17 was used.

EXAMPLE 25

A lithium secondary battery was produced in the same manner as in Example 10, except that the same negative electrode as that used in Example 17 was used.

EXAMPLE 26

A lithium secondary battery was produced in the same manner as in Example 11, except that the same negative electrode as that used in Example 17 was used.

EXAMPLE 27

A lithium secondary battery was produced in the same manner as in Example 12, except that the same negative electrode as that used in Example 17 was used.

EXAMPLE 28

A lithium secondary battery was produced in the same manner as in Example 13, except that the same negative electrode as that used in Example 17 was used.

EXAMPLE 29

A lithium secondary battery was produced in the same manner as in Example 14, except that the same negative electrode as that used in Example 17 was used.

EXAMPLE 30

A lithium secondary battery was produced in the same manner as in Example 15, except that the same negative electrode as that used in Example 17 was used.

EXAMPLE 31

A lithium secondary battery was produced in the same manner as in Example 16, except that the same negative electrode as that used in Example 17 was used.

EXAMPLE 32

A positive electrode was produced in the same manner as in Example 1, except that the thickness of the positive electrode material mixture layer per side was changed to 65 µm.

Also, a negative electrode material mixture-containing paste was prepared in the same manner as in Example 17, except that a mixture in which a composite of carbon with SiO having an average particle size $D_{50\%}$ of 5 µm (a composite in which the surface of SiO was covered with carbon, the amount of carbon in the composite being 20 mass %) as a negative electrode active material and graphitic carbon having an average particle size $D_{50\%}$ of 16 µm were mixed at a mass ratio of 10:90 (SiO-carbon composite:graphitic carbon) was used. Furthermore, a negative electrode was produced in the same manner as in Example 17, except that the negative electrode material mixture-containing paste was used and that the thickness of the negative electrode material mixture layer per side was changed to 50 µm.

Then, a lithium secondary battery was produced in the same manner as in Example 17, except that the positive electrode and the negative electrode were used.

EXAMPLE 33

A positive electrode was produced in the same manner as in Example 2, except that the thickness of the positive electrode material mixture layer per side was changed to 65 µm. Then, a lithium secondary battery was produced in the same manner as in Example 32, except that the positive electrode was used.

EXAMPLE 34

A positive electrode was produced in the same manner as in Example 4, except that the thickness of the positive electrode material mixture layer per side was changed to 65 µm. Then, a lithium secondary battery was produced in the same manner as in Example 32, except that the positive electrode was used.

COMPARATIVE EXAMPLE 3

A lithium secondary battery was produced in the same manner as in Example 17, except that the same positive electrode as that produced in Comparative Example 1 was used.

COMPARATIVE EXAMPLE 4

A lithium secondary battery was produced in the same manner as in Example 17, except that the same positive electrode as that produced in Comparative Example 2 was used.

COMPARATIVE EXAMPLE 5

A positive electrode was produced in the same manner as in Comparative Example 1, except that the thickness of the positive electrode material mixture layer per side was changed to 65 µm. Then, a lithium secondary battery was produced in the same manner as in Example 32, except that the positive electrode was used.

COMPARATIVE EXAMPLE 6

A positive electrode was produced in the same manner as in Comparative Example 2, except that the thickness of the positive electrode material mixture layer per side was changed to 65 μm. Then, a lithium secondary battery was produced in the same manner as in Example 32, except that the positive electrode was used.

The composition of the positive electrode active material (lithium-containing composite oxide) used in the lithium secondary batteries of Examples 17 to 34 and Comparative Examples 3 to 6, the content of carbon fibers having an average fiber length of 100 nm and an average fiber diameter of 10 nm in the positive electrode material mixture layer (shown as "carbon fiber content in positive electrode material mixture layer" in the tables), and the SiO-carbon composite content in the negative electrode active material are shown in Tables 4 and 5.

Charge/Discharge Cycle Characteristics Test

Each battery was subjected to constant current-constant voltage charge (total charge time: 3 hours) using a constant current of 1 C and a constant voltage of 4.2 V, and then to a constant current discharge at 1 C (end-of-discharge voltage: 2.7 V), and the discharge capacity (mAh) was measured. This was defined as one cycle, and this charge/discharge cycle was repeated 500 times under the above-described conditions, and capacity retention ratio (=discharge capacity at 500th cycle/discharge capacity at 1st cycle×100%) was calculated. The results are also shown in Table 6.

TABLE 4

| | Composition of Lithium-Containing Composite Oxide | | | | Carbon Fiber Content in Positive Electrode Material | SiO-Carbon Composite Content in Negative Electrode |
|---|---|---|---|---|---|---|
| | Compositional Formula | x | a | b | c | Mixture Layer (mass %) | Active Material (mass %) |
| Ex. 17 | $Li_{1.02}Ni_{0.6}Co_{0.2}Mn_{0.2}O_2$ | 0.02 | 60 | 20 | 20 | 1.0 | 5 |
| Ex. 18 | $Li_{1.02}Ni_{0.6}Co_{0.2}Mn_{0.2}O_2$ | 0.02 | 60 | 20 | 20 | 0.25 | 5 |
| Ex. 19 | $Li_{1.02}Ni_{0.6}Co_{0.2}Mn_{0.2}O_2$ | 0.02 | 60 | 20 | 20 | 1.5 | 5 |
| Ex. 20 | $Li_{1.02}Ni_{0.6}Co_{0.3}Mn_{0.1}O_2$ | 0.02 | 60 | 30 | 10 | 1.0 | 5 |
| Ex. 21 | $Li_{1.02}Ni_{0.6}Co_{0.1}Mn_{0.3}O_2$ | 0.02 | 60 | 10 | 30 | 1.0 | 5 |
| Ex. 22 | $Li_{1.02}Ni_{0.55}Co_{0.15}Mn_{0.3}O_2$ | 0.02 | 55 | 15 | 30 | 1.0 | 5 |
| Ex. 23 | $Li_{1.02}Ni_{0.55}Co_{0.2}Mn_{0.25}O_2$ | 0.02 | 55 | 20 | 25 | 1.0 | 5 |
| Ex. 24 | $Li_{1.02}Ni_{0.5}Co_{0.2}Mn_{0.3}O_2$ | 0.02 | 50 | 20 | 30 | 1.0 | 5 |
| Ex. 25 | $Li_{1.02}Ni_{0.5}Co_{0.3}Mn_{0.2}O_2$ | 0.02 | 50 | 30 | 20 | 1.0 | 5 |
| Ex. 26 | $LiNi_{0.64}Co_{0.2}Mn_{0.15}Mg_{0.01}O_2$ | 0 | 64 | 20 | 15 | 1.0 | 5 |
| Ex. 27 | $LiNi_{0.638}Co_{0.2}Mn_{0.15}Mg_{0.01}Ge_{0.002}O_2$ | 0 | 63.8 | 20 | 15 | 1.0 | 5 |

TABLE 5

| | Composition of Lithium-Containing Composite Oxide | | | | Carbon Fiber Content in Positive Electrode Material | SiO-Carbon Composite Content in Negative Electrode |
|---|---|---|---|---|---|---|
| | Compositional Formula | x | a | b | c | Mixture Layer (mass %) | Active Material (mass %) |
| Ex. 28 | $LiNi_{0.638}Co_{0.2}Mn_{0.15}Mg_{0.01}B_{0.002}O_2$ | 0 | 63.8 | 20 | 15 | 1.0 | 5 |
| Ex. 29 | $LiNi_{0.638}Co_{0.2}Mn_{0.15}Mg_{0.01}Ga_{0.002}O_2$ | 0 | 63.8 | 20 | 15 | 1.0 | 5 |
| Ex. 30 | $LiNi_{0.638}Co_{0.2}Mn_{0.15}Mg_{0.01}Sr_{0.002}O_2$ | 0 | 63.8 | 20 | 15 | 1.0 | 5 |
| Ex. 31 | $LiNi_{0.638}Co_{0.2}Mn_{0.15}Mg_{0.01}Ba_{0.002}O_2$ | 0 | 63.8 | 20 | 15 | 1.0 | 5 |
| Ex. 32 | $Li_{1.02}Ni_{0.6}Co_{0.2}Mn_{0.2}O_2$ | 0.02 | 60 | 20 | 20 | 1.0 | 10 |
| Ex. 33 | $Li_{1.02}Ni_{0.6}Co_{0.2}Mn_{0.2}O_2$ | 0.02 | 60 | 20 | 20 | 0.25 | 10 |
| Ex. 34 | $Li_{1.02}Ni_{0.6}Co_{0.2}Mn_{0.2}O_2$ | 0.02 | 60 | 20 | 20 | 1.5 | 10 |
| Comp. Ex. 3 | $Li_{1.02}Ni_{0.6}Co_{0.2}Mn_{0.2}O_2$ | 0.02 | 60 | 20 | 20 | 0.15 | 5 |
| Comp. Ex. 4 | $Li_{1.02}Ni_{0.6}Co_{0.2}Mn_{0.2}O_2$ | 0.02 | 60 | 20 | 20 | 2.0 | 5 |
| Comp. Ex. 5 | $Li_{1.02}Ni_{0.6}Co_{0.2}Mn_{0.2}O_2$ | 0.02 | 60 | 20 | 20 | 0.15 | 10 |
| Comp. Ex. 6 | $Li_{1.02}Ni_{0.6}Co_{0.2}Mn_{0.2}O_2$ | 0.02 | 60 | 20 | 20 | 2.0 | 10 |

The lithium secondary batteries of Examples 17 to 34 and Comparative Examples 3 to 6 were subjected to the following tests conducted at room temperature (25° C.).

Load Characteristics Test

Each battery was charged at a constant current of 1 C (corresponding to 1300 mA) and a constant voltage of 4.2 V (charge time was restricted to 3 hours) and then discharged at a constant current of 0.2 C until the battery voltage reached 2.7 V, and thereby the discharge capacity at 0.2 C was obtained. Next, each battery was charged under the same conditions as described above and then discharged at a constant current of 2 C until the battery voltage reached 2.7 V, and thereby the discharge capacity at 2 C was obtained. The ratio (2 C/0.2 C discharge capacity ratio) of discharge capacity at 2 C to discharge capacity at 0.2 C was determined in percentage (%), and evaluated as the load characteristics of the battery. The results are shown in Table 6.

TABLE 6

| | 2 C/0.2 C | Charge/Discharge Cycle Characteristics Test | |
|---|---|---|---|
| | Discharge Capacity Ratio (%) | Discharge Capacity at 1st Cycle (mAh) | Capacity Retention Ratio (%) |
| Ex. 17 | 95.0 | 1290 | 82.0 |
| Ex. 18 | 91.2 | 1270 | 80.5 |
| Ex. 19 | 92.7 | 1240 | 83.1 |
| Ex. 20 | 95.0 | 1290 | 81.9 |
| Ex. 21 | 95.2 | 1290 | 81.8 |
| Ex. 22 | 95.2 | 1290 | 82.3 |
| Ex. 23 | 95.1 | 1290 | 81.0 |
| Ex. 24 | 94.9 | 1290 | 81.5 |
| Ex. 25 | 94.8 | 1290 | 81.9 |
| Ex. 26 | 95.1 | 1290 | 83.0 |

TABLE 6-continued

|  | 2 C/0.2 C | Charge/Discharge Cycle Characteristics Test | |
|---|---|---|---|
|  | Discharge Capacity Ratio (%) | Discharge Capacity at 1st Cycle (mAh) | Capacity Retention Ratio (%) |
| Ex. 27 | 95.2 | 1290 | 82.0 |
| Ex. 28 | 95.2 | 1290 | 81.2 |
| Ex. 29 | 95.1 | 1290 | 80.7 |
| Ex. 30 | 95.2 | 1290 | 81.1 |
| Ex. 31 | 95.1 | 1290 | 81.7 |
| Ex. 32 | 97.2 | 1405 | 81.5 |
| Ex. 33 | 92.3 | 1380 | 80.1 |
| Ex. 34 | 94.5 | 1380 | 82.4 |
| Comp. Ex. 3 | 75.8 | 1170 | 48.1 |
| Comp. Ex. 4 | 89.7 | 1190 | 74.1 |
| Comp. Ex. 5 | 76.1 | 1285 | 46.0 |
| Comp. Ex. 6 | 89.8 | 1280 | 72.3 |

As is clear from Table 6, the lithium secondary batteries of Examples 17 to 34, which included the positive electrode containing an appropriate amount of carbon fibers having a suitable configuration in the positive electrode material mixture layer, exhibited excellent load characteristics with a high 2 C/0.2 C discharge capacity ratio, and also had a large discharge capacity at the first cycle in the charge/discharge cycle characteristics test, a high capacity, a high capacity retention ratio after the 500th cycle, and good charge/discharge cycle characteristics.

In contrast, the batteries of Comparative Examples 3 to 6, which included the positive electrode having a large or small amount of carbon fibers in the positive electrode material mixture layer, exhibited poorer performance than the batteries of Examples 17 to 34 particularly in terms of load characteristics and capacity retention ratio.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A lithium secondary battery positive electrode comprising a positive electrode material mixture layer containing a positive electrode active material and a conductivity enhancing agent on one or both sides of a current collector,
wherein the positive electrode active material contains a lithium-containing composite oxide,
the conductivity enhancing agent contains carbon fibers having an average fiber length of 10 nm or more and less than 1000 nm and an average fiber diameter of 1 nm or more and 100 nm or less,
the content of the carbon fibers in the positive electrode material mixture layer is 0.25 mass % or more and 1.5 mass % or less and the carbon fibers are dispersed in the positive electrode material mixture layer,
the positive electrode active material contains a layer-structured lithium-containing composite oxide represented by the general compositional formula: $Li_{1+x}MO_2$,
where x is within a range of $-0.15 \leq x \leq 0.15$, and M represents an element group of three or more elements including at least Ni, Co and Mn, and
the ratios of Ni, Co and Mn to the total elements constituting M satisfy $45 \leq a \leq 90$, $5 \leq b \leq 30$, $5 \leq c \leq 30$ and $10 \leq b+c \leq 55$, where the ratios of Ni, Co and Mn are represented by a, b and c, respectively, in units of mol %.

2. The lithium secondary battery positive electrode according to claim 1, wherein the conductivity enhancing agent further contains graphite.

3. The lithium secondary battery positive electrode according to claim 2,
wherein the content of the graphite is 25 mass % or more and 87.5 mass % or less when the total content of the carbon fibers and the graphite in the positive electrode material mixture layer is taken as 100 mass %.

4. The lithium secondary battery positive electrode according to claim 1,
wherein the element group M in the general compositional formula further includes at least one element M' selected from Ge, Ca, Sr, Ba, B, Zr and Ga.

5. The lithium secondary battery positive electrode according to claim 4,
wherein the ratio of the element M' in the element group M is 10 mol % or less.

6. A lithium secondary battery comprising a positive electrode, a negative electrode, a non-aqueous electrolyte and a separator,
wherein the positive electrode comprises a positive electrode material mixture layer containing a positive electrode active material and a conductivity enhancing agent on one or both sides of a current collector,
the positive electrode active material contains a lithium-containing composite oxide,
the conductivity enhancing agent contains carbon fibers having an average fiber length of 10 nm or more and less than 1000 nm and an average fiber diameter of 1 nm or more and 100 nm or less,
the content of the carbon fibers in the positive electrode material mixture layer is 0.25 mass % or more and 1.5 mass % or less and the carbon fibers are dispersed in the positive electrode material mixture layer,
the positive electrode active material contains a layer-structured lithium-containing composite oxide represented by the general compositional formula: $Li_{1+x}MO_2$,
where x is within a range of $-0.15 \leq x \leq 0.15$, and M represents an element group of three or more elements including at least Ni, Co and Mn, and
the ratios of Ni, Co and Mn to the total elements constituting M satisfy $45 \leq a \leq 90$, $5 \leq b \leq 30$, $5 \leq c \leq 30$ and $10 \leq b+c \leq 55$, where the ratios of Ni, Co and Mn are represented by a, b and c, respectively, in units of mol %.

7. The lithium secondary battery according to claim 6, wherein the conductivity enhancing agent further contains graphite.

8. The lithium secondary battery according to claim 7,
wherein the content of the graphite is 25 mass % or more and 87.5 mass % or less when the total content of the carbon fibers and the graphite in the positive electrode material mixture layer is taken as 100 mass %.

9. The lithium secondary battery according to claim 6,
wherein the element group M in the general compositional formula further includes at least one element M' selected from Ge, Ca, Sr, Ba, B, Zr and Ga.

10. The lithium secondary battery according to claim 9,
wherein the ratio of the element M' in the element group M is 10 mol % or less.

11. The lithium secondary battery according to claim 6,
wherein the negative electrode comprises, on one or both sides of a current collector, a negative electrode material mixture layer containing a composite of a carbon material with a material containing Si and O as constituent elements in which the atomic ratio x of O to Si satisfies $0.5 \leq x \leq 1.5$.

12. The lithium secondary battery according to claim 11, wherein the non-aqueous electrolyte contains 0.1 mass % or more and 10 mass % or less of 4-fluoro-1,3-dioxolane-2-one and 0.1 mass % or more and 10 mass % or less of vinylene carbonate.

13. The lithium secondary battery according to claim 6, wherein the ratio P/N of the mass P of the positive electrode active material to the mass N of the negative electrode active material is 1.0 or more and 3.6 or less.

14. The lithium secondary battery according to claim 6, wherein the separator includes a porous layer (I) composed mainly of a resin having a melting point of 140° C. or less and a porous layer (II) composed mainly of a resin that does not melt at a temperature of 150° C. or less or an inorganic filler having a heat resistance temperature of 150° C. or more.

* * * * *